US012049071B2

(12) United States Patent
Abayasinghe et al.

(10) Patent No.: US 12,049,071 B2
(45) Date of Patent: Jul. 30, 2024

(54) NEAR INFRARED REFLECTING COMPOSITION AND COVERINGS FOR ARCHITECTURAL OPENINGS INCORPORATING SAME

(71) Applicant: 3G MERMET CORPORATION, Cowpens, SC (US)

(72) Inventors: Nilmini K. Abayasinghe, Spartanburg, SC (US); Philippe E. Paugois, Duncan, SC (US)

(73) Assignee: 3G MERMET CORPORATION, Cowpens, SC (US)

( * ) Notice: Subject to any disclaimer, the term of this patent is extended or adjusted under 35 U.S.C. 154(b) by 928 days.

(21) Appl. No.: 16/531,865

(22) Filed: Aug. 5, 2019

(65) Prior Publication Data

US 2019/0350399 A1     Nov. 21, 2019

Related U.S. Application Data

(62) Division of application No. 13/991,293, filed as application No. PCT/US2011/063022 on Dec. 2, 2011, now abandoned.

(Continued)

(51) Int. Cl.
*D06M 23/08*     (2006.01)
*A47H 23/10*     (2006.01)
(Continued)

(52) U.S. Cl.
CPC .............. *B32B 5/26* (2013.01); *A47H 23/10* (2013.01); *B32B 15/08* (2013.01); *B32B 15/14* (2013.01);
(Continued)

(58) Field of Classification Search
CPC ............. D06M 15/248; D06M 15/333; D06M 15/507–513; D06M 15/564–579;
(Continued)

(56) References Cited

U.S. PATENT DOCUMENTS 2,348,687 A     5/1944   Abrams et al.
2,939,200 A *   6/1960   Ewing .................... D03D 15/47
                                                              28/169

(Continued)

FOREIGN PATENT DOCUMENTS

EP     0556649     6/1999
EP     1941996     7/2008
(Continued)

OTHER PUBLICATIONS

Korean Patent Office, Office Action KR10-2013-7016865, dated Jan. 31, 2018, (14 pages) (With English Translation).

(Continued)

*Primary Examiner* — Larissa Rowe Emrich
(74) *Attorney, Agent, or Firm* — Dority & Manning, P.A.

(57) ABSTRACT

Disclosed are compositions that can be used in forming products with increased near infrared (IR) reflective capability. A composition can include IR reflective and/or IR transmissive non-white pigments and can be formed with suitable viscosity so as to successfully coat substrates, e.g., yarns, suitable for use in forming coverings for architectural openings, e.g., window coverings. Also disclosed are textile substrates coated with the compositions, including textile substrates coated with compositions that in dude abrasive, inorganic IR reflective dark pigments.

25 Claims, 4 Drawing Sheets

Related U.S. Application Data

(60) Provisional application No. 61/419,481, filed on Dec. 3, 2010.

(51) Int. Cl.

| | |
|---|---|
| *B32B 5/26* | (2006.01) |
| *B32B 15/08* | (2006.01) |
| *B32B 15/14* | (2006.01) |
| *B32B 15/20* | (2006.01) |
| *B32B 21/08* | (2006.01) |
| *B32B 21/10* | (2006.01) |
| *B32B 27/12* | (2006.01) |
| *C08J 7/06* | (2006.01) |
| *C08K 3/22* | (2006.01) |
| *C08K 5/12* | (2006.01) |
| *C09D 5/33* | (2006.01) |
| *C09D 127/06* | (2006.01) |
| *D01F 1/10* | (2006.01) |
| *D02G 3/40* | (2006.01) |
| *D06M 14/32* | (2006.01) |
| *D06M 14/34* | (2006.01) |
| *D06N 3/00* | (2006.01) |
| *D06N 3/06* | (2006.01) |
| *D06P 1/44* | (2006.01) |
| *E04F 10/02* | (2006.01) |
| *E06B 9/24* | (2006.01) |
| *C08K 3/013* | (2018.01) |
| *C08K 5/00* | (2006.01) |

(52) U.S. Cl.
CPC .............. *B32B 15/20* (2013.01); *B32B 21/08* (2013.01); *B32B 21/10* (2013.01); *B32B 27/12* (2013.01); *C08J 7/06* (2013.01); *C08K 3/22* (2013.01); *C08K 5/12* (2013.01); *C09D 5/004* (2013.01); *C09D 127/06* (2013.01); *D01F 1/106* (2013.01); *D02G 3/404* (2013.01); *D06M 14/32* (2013.01); *D06M 14/34* (2013.01); *D06M 23/08* (2013.01); *D06N 3/0006* (2013.01); *D06N 3/0022* (2013.01); *D06N 3/0065* (2013.01); *D06N 3/06* (2013.01); *D06P 1/44* (2013.01); *E04F 10/02* (2013.01); *E06B 9/24* (2013.01); *B32B 2262/0253* (2013.01); *B32B 2262/0276* (2013.01); *B32B 2262/062* (2013.01); *B32B 2262/101* (2013.01); *B32B 2262/14* (2013.01); *B32B 2419/00* (2013.01); *C08J 2327/06* (2013.01); *C08J 2467/02* (2013.01); *C08K 3/013* (2018.01); *C08K 5/0041* (2013.01); *D06N 2201/082* (2013.01); *Y10T 428/24942* (2015.01); *Y10T 442/2131* (2015.04); *Y10T 442/2598* (2015.04)

(58) Field of Classification Search
CPC ....... D06M 15/59–598; D06M 15/227; D06M 2200/25; D01F 1/106
See application file for complete search history.

(56) References Cited

U.S. PATENT DOCUMENTS

| | | | |
|---|---|---|---|
| 3,338,992 A | 8/1967 | Kinney | |
| 3,341,394 A | 9/1967 | Kinney | |
| 3,502,538 A | 3/1970 | Petersen | |
| 3,502,763 A | 3/1970 | Hartmann | |
| 3,542,615 A | 11/1970 | Dobo et al. | |
| 3,692,618 A | 9/1972 | Dorchner et al. | |
| 3,802,817 A | 4/1974 | Matsuki et al. | |
| 3,849,241 A | 11/1974 | Butin et al. | |
| 4,027,073 A | 5/1977 | Clark | |
| 4,218,218 A | 8/1980 | Daubach et al. | |
| 4,312,913 A | 1/1982 | Rheaume | |
| 4,340,563 A | 7/1982 | Appel et al. | |
| 4,418,739 A | 12/1983 | Woolnough et al. | |
| 4,427,614 A | 1/1984 | Barham et al. | |
| 4,474,830 A * | 10/1984 | Taylor | B29C 48/304 |
| | | | 427/407.1 |
| 4,586,934 A | 5/1986 | Blalock et al. | |
| 4,587,997 A * | 5/1986 | Brooks | D03D 15/00 |
| | | | 139/420 R |
| 4,880,592 A | 11/1989 | Martini et al. | |
| 4,994,317 A | 2/1991 | Dugan et al. | |
| 5,037,475 A | 8/1991 | Chida et al. | |
| 5,038,555 A | 8/1991 | Wu et al. | |
| 5,085,698 A | 2/1992 | Ma et al. | |
| 5,186,846 A | 2/1993 | Brueckmann et al. | |
| 5,231,131 A | 7/1993 | Chu et al. | |
| 5,382,400 A | 1/1995 | Pike et al. | |
| 5,405,962 A | 4/1995 | Muellen et al. | |
| 5,447,758 A | 9/1995 | Pelletier | |
| 5,514,428 A | 5/1996 | Kunert | |
| 5,525,281 A | 6/1996 | Lorcks et al. | |
| 5,986,099 A | 11/1999 | Mullen et al. | |
| 6,124,458 A | 9/2000 | Muellen et al. | |
| 6,159,875 A | 12/2000 | Jetzer et al. | |
| 6,174,360 B1 | 1/2001 | Sliwinski et al. | |
| 6,185,039 B1 | 2/2001 | Allen et al. | |
| 6,486,319 B1 | 11/2002 | Bohm et al. | |
| 6,521,038 B2 | 2/2003 | Yanagimoto et al. | |
| 6,531,010 B2 | 3/2003 | Puppin | |
| 6,632,860 B1 | 10/2003 | Hansen et al. | |
| 6,737,159 B2 | 5/2004 | Garrett et al. | |
| 6,878,825 B2 | 4/2005 | Krieger et al. | |
| 6,890,377 B2 | 5/2005 | Bohm et al. | |
| 6,989,056 B2 | 1/2006 | Babler | |
| 7,347,266 B2 | 3/2008 | Crews et al. | |
| 7,416,601 B2 | 8/2008 | Erk et al. | |
| 7,544,416 B2 | 6/2009 | Bellemare | |
| 7,625,627 B2 | 12/2009 | Smith et al. | |
| 7,662,474 B2 | 2/2010 | Conesa et al. | |
| 7,745,003 B2 | 6/2010 | Hennemann et al. | |
| 7,799,126 B2 | 9/2010 | Handrosch et al. | |
| 7,823,979 B2 | 11/2010 | Schwartz et al. | |
| 8,202,616 B2 * | 6/2012 | Suzuki | B32B 7/12 |
| | | | 428/522 |
| 2001/0010367 A1 | 8/2001 | Burnell-Jones | |
| 2003/0016368 A1 | 1/2003 | Aman et al. | |
| 2004/0049030 A1 | 3/2004 | Bohm et al. | |
| 2004/0068114 A1 | 4/2004 | Krieger et al. | |
| 2004/0191540 A1* | 9/2004 | Jakobi | B05D 7/57 |
| | | | 428/457 |
| 2006/0154049 A1 | 7/2006 | Padiyath et al. | |
| 2006/0255496 A1 | 11/2006 | Wells | |
| 2007/0015426 A1 | 1/2007 | Ahmed et al. | |
| 2007/0109673 A1 | 5/2007 | Padiyath et al. | |
| 2007/0129470 A1 | 6/2007 | Kuvshinnikova et al. | |
| 2007/0129482 A1 | 6/2007 | Kuvshinnikova et al. | |
| 2007/0161310 A1 | 7/2007 | Shope | |
| 2007/0228340 A1 | 10/2007 | Hayes et al. | |
| 2008/0187708 A1 | 8/2008 | Decker et al. | |
| 2009/0054574 A1* | 2/2009 | Holt | C08K 5/0016 |
| | | | 524/321 |
| 2009/0098476 A1 | 4/2009 | Denton et al. | |
| 2009/0268278 A1 | 10/2009 | Suzuki et al. | |
| 2010/0032608 A1 | 2/2010 | Peri et al. | |
| 2010/0047620 A1* | 2/2010 | Decker | C09D 7/41 |
| | | | 428/688 |
| 2010/0050903 A1 | 3/2010 | Mronga et al. | |
| 2010/0122783 A1 | 5/2010 | Harris et al. | |
| 2010/0184901 A1 | 7/2010 | Adochio et al. | |

(56) References Cited

U.S. PATENT DOCUMENTS

2010/0242793 A1\* 9/2010 Greb .................. C09C 1/62
106/404

FOREIGN PATENT DOCUMENTS

| EP | 3473669 A1 \* | 4/2019 | ............... C08K 5/12 |
| JP | 2006273985 | 10/2006 | |
| KR | 100894446 | 4/2009 | |
| WO | WO 2008/083897 | 7/2008 | |

OTHER PUBLICATIONS

ASTM D 2244-05 "Standard Practice for Calculation of Color Tolerances and Color Differences from Instrumentally Measured Color Coordinates," ASTM International, published Nov. 2005, (10 pages).

\* cited by examiner

NEAR INFRARED REFLECTING COMPOSITION AND COVERINGS FOR ARCHITECTURAL OPENINGS INCORPORATING SAME

CROSS REFERENCE TO RELATED APPLICATION

The present application is a divisional application of U.S. patent application Ser. No. 13/991,293 having a filing date of Jul. 22, 2014, which is the U.S. national filing of International Patent Application Number PCT/US2011/063022 having a filing date of Dec. 2, 2011, which, in turn, claims the filing benefit of U.S. Provisional Patent Application Ser. No. 61/419,481 having a filing date of Dec. 3, 2010, the disclosures of all of which are incorporated herein by reference in their entirety for all purposes.

BACKGROUND

Various different types of coverings exist for placement in architectural openings such as windows, doors, archways, and the like. Such coverings include window blinds and shades. Window shades often include a textile woven with polymer-coated yarns that provide strength, flexibility, and abrasion resistance. The core yarns are generally formed of polyester, glass, polyolefin, and the like. The polymer coatings of the yarns can include a polymer resin such as poly(vinyl chloride) (PVC), polyolefins, polyesters, and so forth. Coatings have also been formulated to include a variety of additives including pigments, flame-retardant materials, and UV light absorbers.

There is a growing interest in improving coverings for architectural openings so as to better control solar energy impinging upon a structure. Through passive thermal management of solar radiation, energy consumption can be dramatically decreased. Moreover, increasing global economic development is expected to lead to growing demand for dwindling energy reserves. This combined with increasing global temperatures is expected to elevate the search for improved passive thermal management techniques from an option to a necessity.

Improved energy management through design of architectural coverings is not new. For instance, the above described textile materials have been recognized as providing good heat insulating properties. White pigments, such as titanium dioxide-based pigments, have been utilized to improve solar control. For example, an article formed with titanium dioxide-based pigment can reflect more than 70% of the near infrared (NIR) radiation. As the heat generated on an article depends primarily upon the NIR reflective properties of the article, use of a highly reflective white pigment can minimize heat generation.

Unfortunately, in order to form a non-white covering for an architectural opening, a price has been paid in passive solar management. Darker colored materials including conventional carbon black-based pigments will reflect only about 5% of the impinging solar radiation. The increased absorbance of NIR leads to increased surface temperature of the covering itself, as well as increased temperatures of the surroundings. Moreover, the thermal stress placed on the darker materials over time leads to a shorter life span for the coverings.

Infrared (IR) reflective pigments and IR transparent pigments have been known for some time (see, e.g., U.S. Pat. Nos. 6,174,360, 6,521,038, and 7,416,601, which are incorporated herein by reference). These materials have been suggested for use in military applications, in roofing, and in inks. Unfortunately, these materials present processing and use difficulties in other applications. For instance, IR reflective inorganic pigments are highly abrasive, and as such they have not been utilized as coloring agents for yarns/textiles. In addition, the pigment add-on level necessary to form desired dark colors often makes the composition too highly viscous for processing conditions necessary to coat certain substrates. For instance, in order to obtain a black coating, a black pigment will often be added to a pigment composition at a concentration of about 20 parts per hundred parts resin (phr), with the resulting formulation having a viscosity of about 10,000 cP, making certain processing methods (e.g., fiber coating methods) impractical if not impossible.

In view of the above, a need currently exists for compositions that can be used to form materials in non-white, deeper tones for covering architectural openings. More specifically, a need exists for non-white compositions and products such as window coverings that exhibit good solar management properties.

SUMMARY

According to one embodiment, disclosed is a composition for coating a component of an architectural opening, e.g., for coating fibers used to form a window covering. A composition can include a polymeric resin and a non-white pigment. More specifically, the pigment can be an IR reflective pigment or an IR transparent pigment. In order to adequately coat a component, the composition can have a viscosity of less than about 5000 cP as measured with a Brookfield RTV at 20 rpm. The composition can be used to form non-white IR reflective coverings. For instance, the cured composition can have a CIELAB L* value of less than about 90 measured at an observation angle of 25°.

Also disclosed are coverings for architectural openings that incorporate the cured compositions. For instance, a covering incorporating the above cured composition can reflect more than about 15% of impinging solar radiation between about 700 and about 2500 nm. A covering can be a window covering such as a window shade, a window blind, a curtain, an awning, an awning shade, or the like.

Also disclosed are methods for forming a covering for an architectural opening. For instance, a method can include mixing a polymer resin with a non-white pigment to form a composition, the pigment being an IR reflective pigment or an IR transparent pigment. The method can also include adjusting the viscosity of the composition such that the composition has a viscosity of less than about 5000 cP as measured with a Brookfield RTV at 20 rpm, coating a substrate with the composition, and curing the composition. For example, a composition can coat a yarn, and the coated yarn can then be utilized in forming a woven or nonwoven textile for use in forming a window covering, e.g., a window shade.

According to another embodiment, a method can include coating a substrate with multiple layers, at least one of which is a composition that includes one or more IR reflective or IR transparent pigments or combinations thereof.

According to the method, a first layer can be a highly reflective IR layer. For example, the first layer can include white pigment. In one embodiment the first layer can be more IR reflective than the second layer. Both the first and the second layer or alternatively only the second layer can include one or more non-white IR reflective and or transparent pigments.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Figure 1:
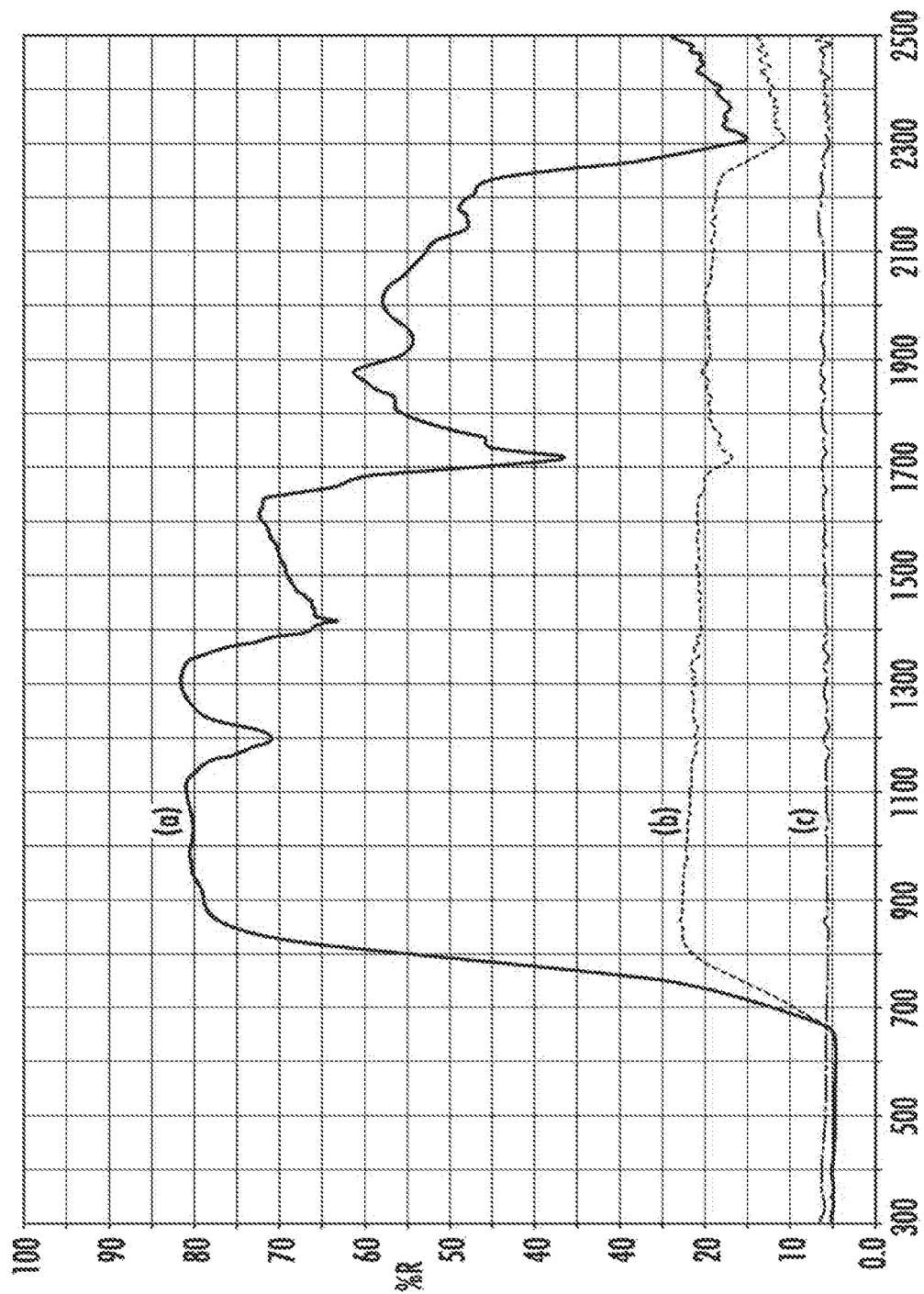
FIG. 1 graphically illustrates the total solar reflection of three different fabrics all formed with black yarns in both the warp and weft, one of which includes NIR reflective yarns as described herein in the warp, one of which includes NIR reflective yarns as described herein in both the warp and weft, and one of which includes traditional yarns made including carbon black pigments as described herein in both the warp and weft.

It is to be understood by one of ordinary skill in the art that the present discussion is a description of exemplary embodiments only, and is not intended as limiting the broader aspects of the present disclosure.

In general, the present disclosure is directed to a composition that can be used in forming products with increased NIR reflective capability. More specifically, disclosed compositions can include IR reflective and/or IR transmissive non-white pigments. Beneficially, the compositions can be formed with suitable viscosity so as to successfully coat substrates suitable for use in forming coverings for architectural openings. For example, a composition can coat fibers or yarns that can be used in forming IR reflective non-white woven window coverings. A fabric including a coated yarn can exhibit greatly increased reflectivity across the NIR and IR spectra as compared to a similar fabric utilizing traditional non-white pigments in the yarn coating.

Also disclosed are textile substrates coated with a composition that includes inorganic IR reflective pigments. Traditionally, such pigments have been considered unsuitable for textile substrates such as yarns due to the abrasive nature of the pigments. These problems have been overcome in the present disclosure by providing an intermediate coating layer between the substrate and the composition that includes the abrasive pigments.

A coating composition can include a polymeric resin that can be either a thermoset or a thermoplastic resin. By way of example, a coating composition can include a resin that is a polyvinyl chloride, acrylic, polyester, polyamide, aramid, polyurethane, polyvinyl alcohol, polyolefin, polylactide and the like. A resin polymer can be a homopolymer or a copolymer. In addition, a copolymer can be a random or a block copolymer. A polymeric resin can include one or more polymers, for instance two or more polymers in a polymeric blend.

When considering a thermoset polymer resin, a composition can also include a crosslinking agent. By way of example, a thermoset polymer resin can be crosslinked by use of an isocyanate crosslinking agent, an organometallic crosslinking agent, and the like.

In one preferred embodiment, the composition can include an emulsion formed from a polymer in an aqueous medium. In general, an emulsion can include a high molecular weight resin; typically a polyurethane, acrylic or methacrylic resin can be utilized in forming an emulsion-based coating composition.

The polymer of the composition can be polymerized at any point during processing of the composition. For instance, a composition can be formed including monomers and/or oligomers, and these substituents can be polymerized during or following formation of the composition. By way of example, a composition can be utilized to coat a substrate following which the coating can be cured during which polymerization can take place. According to one embodiment, a composition comprising a mixture of monomers can be applied to the substrate, and polymerization can be initiated following the coating process and in conjunction with the cure. Such an embodiment may be particularly beneficial when considering formation of a thermoset coating.

In one preferred embodiment, the composition can include a plastisol formed from a vinyl polymer and a plasticizer. In general, a plastisol can include a plasticizer and a high molecular weight resin, typically a polyvinyl chloride (PVC) or an acrylic, and can form a flexible, permanently plasticized coating composition.

As stated, polymers encompassed herein include homopolymers and copolymers. For example, a PVC polymer in a coating composition can be a PVC homopolymer or a copolymer. A PVC copolymer can be formed from vinyl chloride monomer and at least one other monomer chosen from the group consisting of methacrylate, acrylonitrile, styrene, phenyleneoxide, acrylic acid, maleic anhydride, vinyl alcohol and vinyl acetate.

A plasticizer is generally a compound with low volatility that has the ability to disperse polymeric resin particles of the plastisol. A plasticizer can also facilitate adherence of the polymeric resin to a substrate. Typical plasticizers include, normal and branched chain alcoholic esters and glycol esters of various mono-, di- and tri-basic acids, for example esters of phthlic, adipic, sebacic, azelaic, citric, trimellitic (and anhydride) and phosphoric acids; chlorohydrocarbons; esters of long chain alcohols; liquid polyesters; and epoxidized natural oils, such as linseed and soya oils.

Representative phthalate plasticizers include: di-2-ethylhexyl phthalate, n-C6-C8-C10 phthalate, n-C7-C9-C11 phthalate, n-octyl-n-decyl phthalate, ditridecyl phthalate, diisonyl phthalate, diisooctyl phthalate, diisodecyl phthalate, butylbenzylphthalate, dihexyl phthalate, butyl ocytyl phthlate, dicapryl phthalate, di-2-ethylhexyl isophthalate, alkyl benzene phthalates, dimethyl phthalate, dibutyl phthalate, diisobutyl phthalate, butyl isodecyl phthalate, butyl iso-hexyl phthalate, dinonyl phthalate, diisononyl phthalate, dioctyl phthalate, hexyl octyl decyl phthalate, didecyl phthalate diisodecyl phthalate, diundecyl phthalate, butyl-ethyl-hexyl phthalate, butylbenzyl phthalate, octylbenzyl phthalate, dicyclohexyl phthalate, diphenyl phthalate, aklylaryl phthalates, and 2-ethylhexylisodecyl phthalate.

Additional plasticizers include: abietic derivatives, acetic acid derivatives, adipic acid derivatives (e.g., di-2-ethylhexyl adipate, diisononyl adipate, diisodecyl adipate), azelaic acid derivatives (e.g., di-2-ethylhexyl azelate), benzoic acid derivatives, polyphonyl derivatives, citric acid derivatives, epoxy derivatives (e.g., epoxidized soybean oil and epoxidized linseed oil), formal derivatives, fumaric acid derivatives, glutaric acid derivatives, glycol derivatives (e.g., dipropylene glycol dibenzoate), and so forth.

The amount of plasticizer included in a composition can depend upon the desired characteristics of the product to be formed. For instance, a higher plasticizer level can lead to a lower cold flex temperature of the composition, with accompanying decrease in strength and hardness. In general, a plasticizer, when included in the composition, can be present in an amount between about 30 and about 60 parts per hundred parts of the resin (phr).

A composition can also include at least one of an IR reflective pigment and an IR transparent pigment. The IR reflective pigment or IR transparent pigment will exhibit a color, i.e., it will have an absorption peak in the visible spectrum, between about 390 and about 750 nm. In addition, the composition will include an IR reflective or IR transparent pigment that is a non-white pigment. In one embodiment, the IR reflective pigment or IR transparent pigment can be a black pigment. The composition can also include multiple different pigments. For instance, the composition can also include mixtures of pigments including both non-white and white pigments.

Of course, the composition can include mixtures of IR reflective pigments and/or IR transparent pigments to provide a coating having a desired color and solar control characteristics. Moreover, a composition can include one or more IR reflective pigment(s) and/or IR transparent pigment (s) that are colorless, in addition to the one or more pigments that have a color. Pigments can likewise be transparent in the visible spectrum or opaque.

In general, a coating can include pigments such that a coating formed of the composition can be a non-white coating. By way of example, a cured coating formed of the composition can have a CIELAB L* value of less than about 90, less than about 70, less than about 50, less than about 30, less than about 20, or less than about 10, measured at an observation angle of 25°.

As utilized herein, the term IR reflective pigment generally refers to a pigment that, when included in a composition, provides a cured coating with a reflectance of NIR radiation, i.e., electromagnetic radiation having a wavelength of from about 700 to about 2500 nanometers. By way of example, a coating formed of a composition including one or more IR reflective pigments can exhibit a solar reflectance that is about 10%, about 15%, or about 20% higher than a similar coating but for the inclusion of the IR reflective pigment. In one embodiment, the UV/VIS/IR spectra of the coating and/or a composite including the coating on a substrate can be measured according to ASTM E 903-96. The solar reflectance can in one embodiment be calculated according to ASTM E-891 in the wavelength range of about 250 to about 2500 nanometers.

An IR reflective pigment can exhibit less than, the same as or greater reflectivity in the NIR wavelength region than it does in the visible region. For example, the ratio of reflectivity in the NIR region to the reflectivity in the visible region can be greater than 1:1, such as about 2:1, greater than about 3:1, greater than about 10:1, or greater than about 15:1.

Any IR reflective pigment as is generally known in the art is encompassed herein. For instance, an IR reflective pigment can be an inorganic oxide pigment. Exemplary IR reflective pigments can include, without limitation, titanium dioxide, zinc sulfide, titanium brown spinal, chromium oxide green, iron oxide red, chrome titanate yellow, and nickel titanate yellow.

IR reflective pigments can include metals and metal alloys of aluminum, chromium, cobalt, iron, copper, manganese, nickel, silver, gold, iron, tin, zinc, bronze, brass. Metal alloys can include zinc-copper alloys, zinc-tin alloys, and zinc-aluminum alloys, among others. Some specific examples include nickel antimony titanium, nickel niobium titanium, chrome antimony titanium, chrome niobium, chrome tungsten titanium, chrome iron nickel, chromium iron oxide, chromium oxide, chrome titanate, manganese antimony titanium, manganese ferrite, chromium green-black, cobalt titanates, chromites, or phosphates, cobalt magnesium, and alurninites, iron oxide, iron cobalt ferrite, iron titanium, zinc ferrite, zinc iron chromite, copper chromite, as well as combinations thereof. Commercially available inorganic IR reflective pigments include those sold under the trade names Sicopal®, Meteor®, and Sicotan®, all available from BASF Corporation, Southfield, Mich. Other inorganic IR reflective pigments are available from The Shepherd Color Company of Cincinnati, Ohio and Ferro of Cleveland, Ohio.

As mentioned, transparent and/or translucent IR reflective pigments can also be incorporated in disclosed compositions. For example, Solarflair 9870 pigment (commercially available from Merck KGaA of Darmstadt, Germany) can be used, which is translucent and essentially colorless when utilized in small amounts.

IR reflective pigments can be homogeneous or heterogeneous. For instance, an IR reflective pigment can be a composite material including a coating on a core material, for instance a silica core coated with a metal, such as copper, or a titanium dioxide-coated mica particle. Exemplary composite pigments including a coloring pigment adsorbed on the surface of a metallic particle are described in U.S. Pat. No. 5,037,475, to Chida, et al., which is incorporated herein by reference. Such colored metallic pigments are commercially available from U.S. Aluminum, Inc., Flemington, N.J., under the trade name FIREFLAKE.

Specific examples of IR reflective pigments can include Sicotan® Yellow K 1010, Sicotan® Yellow K 1011/K 1011FG, Sicopal® Yellow K 1120 FG, Sicopal® Yellow K 1160 FG, Sicotan® Yellow K 2001 FG, Sicotan® Yellow K 2011 FG, Sicotan® Yellow NBK 2085, Sicotan® Yellow K 2111 FG, Sicotan® Yellow K 2112 FG, Meteor® Plus Buff 9379, Meteor® Plus Buff 9379 FF, Meteor® Plus Buff 9399 FF, Meteor® Buff 7302, Meteor® Plus Golden 9304, Sicotan® Orange K 2383, Sicotrans® Red K 2819, Sicotrans® Red K 2915, Meteor® Plus Red-Buff 9384, Sicopal® Brown K 2595, Sicotan® Brown K 2611, Sicotan® Brown K 2711, Sicopal® Brown K 2795 FG, Meteor® Plus Brown 9730, Meteor® Plus Brown 9770, Sicotan® Brown NBK 2755, Sicopal® Blue K 6310, Meteor® Plus Blue 9538, Sicopal® Green K 9110, Sicopal® Green K 9710, Meteor® Plus Green 9444, Meteor® Plus Black 9875, Meteor® Plus Black 9880, Meteor® Plus Black 9887, Meteor® PlUS Black 9891, Sicopal® Black K 0095 from BASF; Blue 211, Blue 214, Blue 385, Blue 424, Green 187B, Green 223, Green 410, Green 260, Yellow 10P110, Yellow 10P225, Yellow 10P270, Brown 10P857, Brown 10P835, Brown 10P850, Black 10P922, Black 411A from Shepard Color Company; and 22-5091 PK, 22-5096 PK, 22-4050 PK, 21-4047 PK, 23-10408 PK, 26-10550 PK, 24-775 PK, 24-10204 PK, 24-10430 PK, 24-10466 PK, V-9415 Yellow, V-9416 Yellow, 10415 Golden Yellow, 10411 Golden Yellow, 10364 Brown, 10201 Eclipse Black, V-780 IR BRN Black, 10241 Forest Green, V-9248 Blue, V-9250 Bright Blue, F-5686 Turquoise, 10202 Eclipse Black, V-13810 Red, V-12600 IR Cobalt Green, V-12650 Hi IR Green, V-778 IR Brn Black, V-799 Brn Black, 10203 Eclipse Blue Black from Ferro.

The shape and size of the IR reflective pigments are not particularly limited. For instance, a pigment can be spherical, rod-shaped of amorphous shape, or any other geometric shape.

Often, IR reflective pigments define a flat flake shape. A flake-shaped pigment can have a thickness of, e.g., up to about 10 micrometers (μm), for instance between about 0.5 μm and about 10 μm, or between about 1 μm and about 5 μm. In one embodiment, a thin flake particle can have a maximum width of between about 10 μm and about 150 μm, for instance, between about 20 μm and about 100 μm. An individual flat flake can have any shape, e.g., flat surfaces, uneven surfaces, round or jagged edges, and so forth.

When present, a composition can include one or more IR reflective pigment(s) in an amount of up to about 50 phr. For example, a composition can include one or more IR reflective pigments in an amount between about 3 phr and about 40 phr or between about 5 phr and about 15 phr.

A composition can include one or more IR transparent pigments, in addition to or alternative to one or more IR reflective pigments. As used herein, the term IR transparent pigment generally refers to a pigment that is substantially transparent in the near-infrared wavelength region (about 700 to about 2500 nanometers), such as is described in United States Patent Application Publication No. 200410191540 to Jakobi, et al., which is incorporated herein by reference. An IR transparent pigment can generally have an average transmission of at least about 70% in the NIR spectrum.

An IR transparent pigment can be colored or colorless and can be opaque or transparent. In general, however, an IR transparent pigment can absorb in the visible spectrum in at least one wavelength and can provide color to a cured coating formed with the composition. For instance, an IR transparent black pigment can be incorporated in a composition.

In one embodiment, an IR transparent pigment can exhibit reflectance in the NIR spectrum. This reflectance can vary depending upon the wavelength. For instance, the overall amount of reflectance can increase with increasing wavelength. By way of example, an IR transparent pigment can reflect about 10% of the incoming radiation at a wavelength of about 750 nm and can reflect about 90% or more of the incoming radiation at a wavelength of about 900 nm.

An IR transparent pigment can include, without limitation, a perylene based pigment, a phthalocyanine based pigment, a naphthalocyanine based pigment, and the like.

A perylene based pigment refers to a pigment including the general structure:

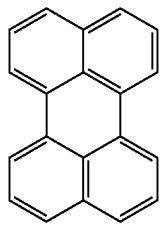 [SMILES: c1cc2cccc3c4cccc5cccc(c(c1)c23)c54]

The term perylene based pigment is intended to include perylene and rylene as well as ions and derivatives thereof that comprise a perylene or rylene core. The term rylene derivative, as used herein, refers to any compound having a rylene core. Stated alternatively, rylene derivatives include any molecule comprising a polycyclic aromatic hydrocarbon (PAH) moiety and having any number of peripheral substituents in place of any of the peripheral hydrogen atoms of the rylene. When more than one peripheral substituent is present, they may be the same or different.

Commercially available examples of perylene pigments include, Lumogen®, Paliogen®, and Heliogen® pigments from BASF Corporation. Additional examples of IR transparent pigments are described in United States Patent Application Publication No. 200910098476 to Denton, et al., which is incorporated herein by reference, and include those having a perylene isoindolene structure, an azomethine structure, and/or an aniline structure.

A phthalocyanine based pigment refers to a pigment having the general structure:

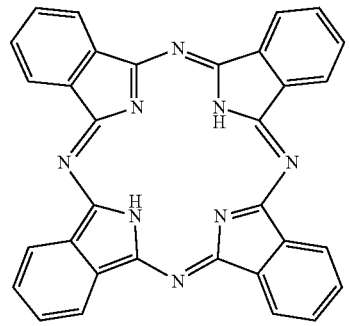 [SMILES: c1ccc2c(c1)-c1nc-2nc2[nH]c(nc3nc(nc4[nH]c(n1)c1ccccc41)-c1ccccc1-3)c1ccccc21]

The term phthalocyanine based pigment is intended to include phthalocyanine as well as ions, metallophthalocyanines, phthalocyanine derivatives and their ions, and metallated phthalocyanine derivatives. The term phthalocyanine derivative refers to any compound having a phthalocyanine core. Stated alternatively, phthalocyanine derivatives include any molecule comprising a tetrabenzo[b, g, I, q]-5, 10,15,20-tetraazaporphyrin moiety and having any number of peripheral substituents in place of any of the peripheral hydrogen atoms bound to the carbon atoms at the 1, 2, 3, 4, 8, 9, 10, 11, 15, 16, 17, 18, 22, 23, 24, or 25 positions of the phthalocyanine moiety. When more than one peripheral substituent is present, the peripheral substituents may be the same or different.

The term naphthalocyanine compound refers to a pigment having the general structure:

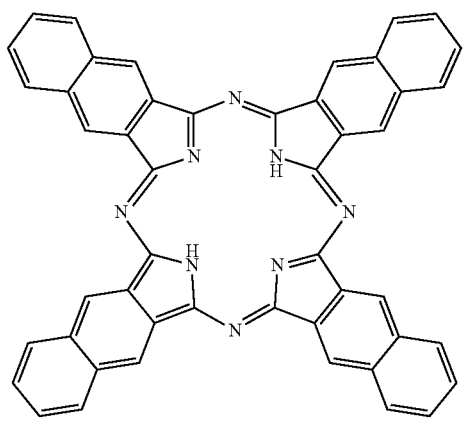 [SMILES: c1ccc2cc3c(cc2c1)-c1nc-3nc2[nH]c(nc3nc(nc4[nH]c(n1)c1cc5ccccc5cc41)-c1cc4ccccc4cc1-3)c1cc3ccccc3cc21]

The term naphthalocyanine based pigment is intended to refer to naphalocyanine and its ions, metallonaphthalocyanines, naphthalocyanine derivatives and their ions, and metallated naphthalocyanine derivatives. The term naphthalocyanine derivative refers to any compound having a naphthalocyanine core. Stated alternatively, naphthalocyanine derivatives include any molecule comprising a tetranaphthalo[b, g, I, q]-5,10,15,20-tetraazaporphyrin moiety and having any number of peripheral substituents in place of any of the peripheral hydrogen atoms bound to the carbon atoms of the naphthalocyanine moiety. When more than one peripheral substituent is present, the peripheral substituents may be the same or different.

Phthalocyanine, naphthalocyanine and rylene compounds suitable for use in the invention include any infrared absorbing phthalocyanine, naphthalocyanine or rylene compound.

Phthalocyanine and naphthalocyanine compounds may be metallated, for example with monovalent metals including sodium, potassium and lithium; with divalent metals including copper, zinc, iron, cobalt, nickel, ruthenium, rhodium, palladium, platinum, manganese, tin, vanadium and calcium; or with trivalent metals, tetravalent metals, or metals of even greater valency.

In general, the charge of any metallated phthalocyanine or naphthalocyanine compound, aside from those containing a divalent metal, will be balanced by a cation or anion of appropriate charge that is often coordinated axially to the metal ion. Examples of suitable ions include, without limitation, halogen anions, metal ions, hydroxide anion, oxide anion ($O^{2-}$) and alkoxide anions.

Phthalocyanine compounds can include, without limitation, aluminum 1,4,8,11,15,18,22,25-octabutoxy-29H,31H-phthalocyanine triethylsiloxide; copper(II) 1,4,8,11,15,18,22,25-octabutoxy-29H,31H-phthalocyanine; nickel(II) 1,4,8,11,15,18,22,25-octabutoxy-29H,31H-phthalocyanine; 1,4,8,11,15,18,22,25-octabutoxy-29H,31H-phthalocyanine; zinc 1,4,8,11,15,18,22,25-octabutoxy-29H,31H-phthalocyanine; copper(II) 2,3,9,10,16,17,23,24-octakis(octyloxy)-29H,31H-phthalocyanine; 2,3,9,10,16,17,23,24-octakis(octyloxy)-29H,31H-phthalocyanine; silicon 2,3,9,10,16,17,23,24-octakis(octyloxy)-29H,31H-phthalocyanine dihydroxide; zinc 2,3,9,10,16,17,23,24-octakis(octyloxy)-29H,31H-phthalocyanine; and mixtures thereof.

Naphthalocyanine compounds can include, without limitation, aluminum 5,9,14,18,23,27,32,36-octabutoxy-2,3-naphthalocyanine triethylsiloxide, copper(II) 5,9,14,18,23,27,32,36-octabutoxy-2,3-naphthalocyanine, nickel(II) 5,9,14,18,23,27,32,36-octabutoxy-2,3-naphthalocyanine, 5,9,14,18,23,27,32,36-octabutoxy-2,3-naphthalocyanine, zinc 5,9,14,18,23,27,32,36-octabutoxy-2,3-naphthalocyanine and mixtures thereof.

Rylene compounds include, without limitation, those described in U.S. Pat. Nos. 5,405,962; 5,986,099; 6,124,458; 6,486,319; 6,737,159; 6,878,825; and 6,890,377; and U.S. Patent Application Publication Nos. 2004/0049030 and 2004/0068114, all of which are incorporated herein by reference.

Additional examples of phthalocyanine, naphthalaocyanine, and rylene IR transparent pigments as may be included in a composition are described in U.S. Patent Application Publication No. 2007/0228340 to Hayes, et al., which incorporated herein by reference.

Other ER transparent pigments can include, without limitation, copper phthalocyanine pigment, halogenated copper phthalocyanine pigment, anthraquinone pigment, quinacridone pigment, perylene pigment, monoazo pigment, disazo pigment, quinophthalone pigment, indanthrone pigment, dioxazine pigment, transparent iron oxide brown pigment, transparent iron oxide red pigment, transparent iron oxide yellow pigment, cadmium orange pigment, ultramarine blue pigment, cadmium yellow pigment, chrome yellow pigment, cobalt aluminate blue pigment, cobalt chromite blue pigment, iron titanium brown spinel pigment, manganese antimony titanium buff rutile pigment, zinc iron chromite brown spinel pigment, isoindoline pigment, diarylide yellow pigment, brominated anthranthron pigment and the like.

Specific examples of IR transparent pigments as may be incorporated in a composition include Paliotol® Yellow K 0961 HD, Paliotol® Yellow K 1700, Paliotol® Yellow K 1841, Paliotol® Yellow K 2270, Diarylide Yellow (opaque) 1270, Rightfit® Yellow K 1220, Rightfit® Yellow 8G 1222, Rightfit® Yellow R 1226, Rightfit® Yellow K 1994, Rightfit® Yellow 1292, Rightfit® Yellow 1293, Rightfit® Yellow 1296, Rightfit® Yellow 3R 1298, Synergy® Yellow HG 6202, Synergy® Yellow 6204, Synergy® Yellow 6205, Synergy® Yellow 6207, Synergy® Yellow 6210, Synergy® Yellow 6213, Synergy® Yellow 6222, Synergy® Yellow 6223, Synergy® Yellow 6225, Synergy® Yellow 6226, Synergy® Yellow 6233, Synergy® Yellow 6234, Synergy® Yellow 6235, Synergy® Yellow 6261, Synergy® Yellow 6268, Synergy® Yellow 6290, Synergy® Yellow 6298, Paliotol® Orange K 2920, Dianisidine Orange 2915, Synergy® Orange 6103, Synergy® Orange 6106, Synergy® Orange 6112, Synergy® Orange 6113, Synergy® Orange Y 6114, Synergy® Orange RL 6118, Synergy® Orange Y 6135, Synergy® Orange HL 6136, Synergy® Orange 6139, Synergy® Orange G 6164, Synergy® Orange 6170, Paliogen® Red K 3580, Paliogen® Red K 3911 H, Citation® Red Light Barium 1058, Naphthol Red Light 3169, Naphthol Red 3170, Naphthol Red 3172, Naphthol Red 3175, MadderLake conc. 1092, Pigment Scarlet 1060, Rightfit® Red K 3790, Rightfit® Red K 4350, Rightfit® Red 1117, Rightfit® Pink 1118, Synergy® Scarlet 6012, Synergy® Red 6016, Synergy® Red 6019, Synergy® Red 6054, Synergy® Red 6065, Synergy® Red 6069, Synergy® Red 6075, Transbarium 2B Red 1057, Synergy® Magenta 6062, Synergy® Red 6027, Supermaroon ST 1090, Paliogen® Red K 4180, Rightfit® Violet 1120, Paliogen® Red Violet K 5011, Heliogen® Blue K 6850, Heliogen® Blue K 6902, Heliogen® Blue K 6903, Heliogen® Blue K 6907, Heliogen® Blue K 6911 D, Heliogen® Blue K 6912 D, Heliogen® Blue K 7090, Heliogen® Blue K 7104 LW, Heliogen® Green K 8605, Heliogen® Green K 8683, Heliogen® Green K 8730 Z, Heliogen® Green K 8740 LW, Heliogen® Green K 9360, Lumogen® Black FK 4280, Lurnogen® Black FK 4281 from BASF.

There is no particular limitation as to the size or shape of IR transparent pigment particles included in a composition. In one embodiment, an IR transparent pigment having an average primary particle size of less than about 200 nm, for instance less than about 100 nm, less than about 50 nanometers or less than about 30 nanometers can be utilized. Such pigment particles have been described in United States Patent Application Publication No. 2008/0187708 to Decker, et al. which is incorporated herein by reference. Such small particle pigments may be useful in forming a coating with low haze. IR transparent pigment particles are not limited to small nanometer-sized particles, however, and in other embodiments, larger IR transparent pigment particles can be utilized.

In general, when present, a composition can include one or more IR transparent pigment(s) in an amount of up to about 50 phr. For example, a composition can include one or more IR transparent pigments in an amount between about 3 phr and about 40 phr or between about 5 phr and about 15 phr.

A composition can include additional pigments, in addition to the one or more IR reflective or IR transparent pigments as discussed above. For instance, in one embodiment, a composition can include an interference pigment. As used herein, the term interference pigment refers to a pigment having a multi-layer structure including alternating layers of material of different refractive index. Examples of interference pigments include, for example, pigments comprising a substrate of mica, $SiO_2$, $Al_2O_3$, $TiO_2$, zinc, copper, chromium, mirrorized silica, glass that is coated with one or more layers of e.g. titanium dioxide, iron oxide, titanium iron oxide or chrome oxide or combinations thereof, or pigments comprising combinations of metal and metal oxide, such as aluminum coated with layers of iron oxide layers and/or silicon dioxide or mixtures thereof.

Interference pigments can also exhibit IR reflective properties. When present, an interference pigment can be included in a composition in an amount up to about 50 phr, for instance up to about 40 phr, or between about 3 and about 15 phr.

Other, more traditional pigments can also be incorporated in a composition. For example, one or more conventional pigments including, but not limited to, ZnS, carbon black, $Fe_2O_3$ red pigment ferric oxides, and compounds of diarylide, isoindolinone, benzimidazolones, azo condensation, quinophthalone, primrose chrome, iron oxides, molybdates, quinacridones, and diketo-pyrrolo-pyrrols, and the like can be included in a composition, in addition to one or more IR reflective or IR transparent pigments.

The total amount of pigments in a composition can vary, depending upon the final application. For example, in one embodiment, the total loading level for all pigments in a coating composition can be up to about 50 phr. Higher or lower total pigment loading levels are also encompassed herein, however.

A composition can include additional additives as are generally known in the art. For example, a composition can include one or more fillers, stabilizers, adhesion promoters, surfactants, lubricants, flame retardants, UV absorbers, antioxidants, and the like. Other additives may include processing aids, flow enhancing additives, lubricants, impact modifiers, dispersants, surfactants, chelating agents, coupling agents, adhesives, primers and the like.

The amount of a particular additive used will depend upon the type of additive and the particular composition and desired application. For example, a UV stabilizer level could be used at levels as low as 0.1 weight percent based on the total weight of the composition. Methods for selecting and optimizing the particular levels and types of additives are known to those skilled in the art.

In one preferred embodiment, a composition can include a viscosity reduction agent. As discussed previously, IR transparent and IR reflective pigments often present difficulties due to the high add-on levels necessary to obtain the desired colors. Specifically, viscosity levels of resulting compositions are too high for utilization in coating certain substrates, for instance a fiber, yarn, thread, or formed woven or nonwoven fabric. Accordingly, a composition can include one or more viscosity reducing agents to provide a composition having a viscosity of less than about 5000 cP, as measured with a Brookfield RTV at 20 rpm, less than about 2500 cP, or less than about 1500 cP.

Any suitable viscosity reducing agent or combination thereof can be utilized. For instance, a viscosity reducing agent can include a mineral oil, hydrogenated polyalphaolefin oil and/or a saturated fatty acid as described in U.S. Pat. No. 7,347,266 to Crews, et al., which is incorporated herein by reference. In one embodiment, a mineral oil viscosity reducing agent can be utilized. Mineral oil (also known as liquid petrolatum) is a by-product in the distillation of petroleum to produce gasoline. It is a chemically inert transparent colorless oil composed mainly of linear, branched, and cyclic alkanes (paraffins) of various molecular weights, related to white petrolatum. Mineral oil products are typically highly refined, through distillation, hydrogenation, hydrotreating, and other refining processes, to have improved properties, and the type and amount of refining varies from product to product. Other names for mineral oil include, but are not necessarily limited to, paraffin oil, paraffinic oil, lubricating oil, white mineral oil, and white oil. One specific example of a viscosity reducing agent as may be included in a composition is Isopar™ isoparaffinic fluids.

Other viscosity reducing agents can include ethers, alcohols, tertiary amines, aldehydes, ketones, and similar compounds that suitably reduce the viscosity of the composition without destroying the composition or any component thereof. Viscosity reducing agents include, without limitation, aliphatic and cycloaliphatic ethers of 2 to 20 carbon atoms such as the straight chain ethers, e.g., di-n-alkyl ethers of 2 to 10 carbon atoms including diethyl ether and dibutyl ether, and cycloalkyl ethers of 5 to 6 carbon atoms, e.g., tetrahydrofuran and tetrahydropyran. Also included are aliphatic and aromatic alcohols such as ethanol, isopropanol and butanol as well as phenyl, benzylalcohol and the others having 20 or fewer carbon atoms. Other suitable agents include organic compounds having no more than about 20 carbon atoms, such as tertiary alkyl amines of 3 to 20 carbon atoms; aldehydes such as acetaldehyde and benzaldehyde; ketones such as methyl ethyl ketone and diethyl ketone as well as acetophenone.

When present, a viscosity reducing agent can generally be included in a composition in an amount of up to about 30 phr, for instance between about 5 and about 20 phr, or between about 10 and about 15 phr. Other add-on levels are likewise encompassed herein, however. A preferred amount of viscosity reducing agent can be determined according to the final desired viscosity of the composition, as is known.

In one embodiment, a composition can include a stabilizer, e.g., a thermal stabilizer. Any known thermal stabilizer or mixture of thermal stabilizers is encompassed herein. Useful thermal stabilizers include phenolic antioxidants, alkylated monophenols, alkylthiomethylphenols, hydroquinones, alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, aminic antioxidants, aryl amines, diaryl amines, polyaryl amines, acylaminophenols, oxamides, metal deactivators, phosphites, phosphonites, benzylphosphonates, ascorbic acid (vitamin C), compounds which destroy peroxide, hydroxylamines, nitrones, thiosynergists, benzofuranones, indolinones, and the like. Generally, when used, thermal stabilizers will be present in the composition in an amount of 0.001 to 10 weight percent based on the total weight of the composition, or less than about 10 phr, for instance between about 2 and about 5 phr.

A composition may contain a UV absorber or a mixture of UV absorbers. General classes of UV absorbers include benzotriazoles, hydroxybenzophenones, hydroxyphenyl triazines, esters of substituted and unsubstituted benzoic acids, and the like and mixtures thereof. Any UV absorber known within the art is encompassed herein. When present, a composition can incorporate from about 0.001 to about 10.0 weight percent UV absorbers, based on the total weight of the composition.

A composition may also incorporate an effective amount of a hindered amine light stabilizers (HALS). Generally, HALS are understood to be secondary, tertiary, acetylated, N-hydrocarbyloxy substituted, hydroxy substituted N-hydrocarbyloxy substituted, or other substituted cyclic amines which further have some degree of steric hindrance, generally derived from aliphatic substitution on the carbon atoms adjacent to the amine function. When present, HALS can be included in a composition in an amount of from about 0.001 to about 10.0 weight percent, based on the total weight of the composition.

Flame retardants as are generally known can also be incorporated in a composition. For example, A. H. Landrocki, "Handbook of Plastic Flammability Fuel and combustion Toxicology," (Noyes Publication, 1983) disclosures fire/flame retardants. Flame retardants for plastics function under heat to yield products that would be more difficult to ignite than the virgin plastics, or that do not propagate flame as readily. They function in one or more ways, either they absorb heat, thereby making sustained burning more difficult, or they form nonflammable char or coating that insulates the substrate from the heat, excludes oxygen, and slows the rate of diffusion of volatile, flammable pyrolysis fragments from the substrate. Flame retardants for plastics may also function by enhancing the decompositon of the substrate, thereby accelerating its melting al lower temperatures so that it drips or flows away from the flame front and by evolving products that stop or slow flame propagation. Still other flame retardants for plastics may function by forming free radicals that convert a polymer to less combustible products and by excluding oxygen from possible burning sites by coating resin particles.

Useful fire retardant agents may vary widely. Illustrative of useful agents are such materials as metal hydroxides and hydrated materials, carbonates, bicarbonates, nitrate hydrates, metal halide hydrates, sulfate hydrates, perchlorate hydrates, phosphate hydrates, sulfites, bisulfites, borates, perchlorates, hydroxides, phosphate salts, and nitrogen containing compounds which thermally decompose to form nitrogen.

A composition can also include a dispersant. For example, a pigment of the composition can be provided as a dispersion that can then be combined with other components of the composition. Dispersants can include, for example, customary dispersants, such as water-soluble dispersants based on one or more arylsulfonic acid/formaldehyde condensation products or on one or more water-soluble oxalkylated phenols, non-ionic dispersants or polymeric acids. The arylsulfonic acid/formaldehyde condensation products are obtainable, for example, by sulfonation of aromatic compounds, such as naphthalene itself or naphthalene-containing mixtures, and subsequent condensation of the resulting arylsulfonic acids with formaldehyde. Such dispersants are known and are described, for example, in U.S. Pat. No. 6,989,056 to Babler, and U.S. Pat. No. 5,186,846 to Brueckmann, et al., which are incorporated herein by reference. Suitable oxalkylated phenols are likewise known and are described, for example, in U.S. Pat. No. 4,218,218 to Daubach, et al., which is incorporated herein by reference. Suitable non-ionic dispersants are, for example, alkylene oxide adducts, polymerisation products of vinylpyrrolidone, vinyl acetate or vinyl alcohol and co- or ter-polymers of vinyl pyrrolidone with vinyl acetate and/or vinyl alcohol.

The dispersant can be a random or structured polymeric dispersant. Random polymers include acrylic polymers and styrene-acrylic polymers. Structured dispersants include AB, BAB and ABC block copolymers, branched polymers and graft polymers. Useful structured polymers are disclosed in, for example, U.S. Pat. Nos. 5,085,698 to Ma, et al. and 5,231,131 to Chu, et al. and in European Patent Application EP 0556649 to Ma, et al., all of which are incorporated herein by reference. Examples of typical dispersants for non-aqueous pigment dispersions include those sold under the trade names: Disperbyk (BYK-Chemie, USA), Solsperse (Avecia) and EFKA (EFKA Chemicals) polymeric dispersants.

The components of a composition can be combined according to standard methods as are generally known in the art. For instance, a composition of a melt or solution including the resin, pigments, and any additional additives (plasticizer, viscosity reducing agent, flame retardant, etc.) can be formed according to standard formation processes. In one embodiment, an energy intensive mixing means can be utilized, optionally at increased temperature, to form the composition. The components of the composition can be combined in any order, as is known. For example, solid components including resin beads or flakes, pigments, etc., can first be combined, as in a ball mill, prior to forming a melt or solution of the components and adding any liquid components, e.g., viscosity reducing agents.

Following formation, a composition can be further processed to form a covering for an architectural opening including, without limitation, a window, an arch, a doorway, and so forth.

In one embodiment, a composition can be molded or otherwise shaped to form a material for use in forming a covering. For instance, a composition can be extruded in film or sheet form, optionally laminated with other films, and applied to a substrate, e.g., a window or a window covering.

A film or sheet of the composition may be made by any suitable process. Thin films, for example, may be formed by compression molding as described in U.S. Pat. No. 4,427,614 to Barham, et al., by melt extrusion as described in U.S. Pat. No. 4,880,592 Martini, et al., by melt blowing as described in U.S. Pat. No. 5,525,281 to Locks, et al., all of which are incorporated herein by reference, or by other suitable processes such as knife coating. Polymeric sheets may be formed by extrusion, calendering, solution casting or injection molding, for example. One of ordinary skill in the art will be able to identify appropriate process parameters based on the polymeric composition and on the method used for sheet or film formation.

When a melt processing method, such as extrusion or injection molding, is used the melt processing temperature of the composition can be from about 50° C. to about 300° C., for instance from about 100° C. to about 250° C.

A film construct can be further processed following formation. Post-formation processing can include, without limitation, shaping, blowing the film to different dimensions, machining, punching, stretching or orienting, rolling, calendering, coating, embossing, printing and radiation such as E-beam treatment to increase the Vicat softening point. For example, films and sheets formed by any method may be oriented, uniaxially or biaxially, by stretching in one or both of the machine and transverse directions after formation according to any suitable methods.

A film or sheet formed of a composition can have a hard coat layer formed on one or both surfaces to protect the layer(s) from scratching, abrasion, and like insults. Any suitable hard coat formulation may be employed. One hard coat is described in U.S. Pat. No. 4,027,073 to Clark, which is incorporated herein by reference.

A film or sheet of a composition can be combined with other films to form a multilayer laminate. A multilayer structures may be formed by any suitable means, such as, for example, coextrusion, blown film, dipcoating, solution coating, blade, puddle, air-knife, printing, Dahlgren, gravure, flexo, powder coating, spraying, laminating, or other art processes. The individual layers may be joined together by heat, adhesive and/or tie layer, for example.

Films for use as additional film layers include oriented and unoriented polyester films, polycarbonate films, polyurethane films and polyvinyl chloride films. In one embodiment, the additional film layer is biaxially oriented poly (ethylene terephthalate). Sheets for use as additional sheet layers can include sheets comprising polyvinyl butyral compositions, acoustic polyvinyl acetal compositions, acoustic polyvinyl butyral compositions, ethylene vinyl acetate compositions, thermoplastic polyurethane compositions, polyvinyl chloride copolymer compositions and ethylene acid copolymer compositions and ionomers derived therefrom.

In one embodiment, a film or sheet can by layered on a glass sheet. The term "glass" as used herein includes window glass, plate glass, silicate glass, sheet glass, float glass, colored glass, specialty glass which may, for example, include ingredients to control solar heating, glass coated with sputtered metals such as silver, for example, glass coated with antimony tin oxide (ATO) and/or indium tin oxide (ITO), E-glass, Solex™ glass (PPG Industries of Pittsburgh, Pa.) and Toroglass™. A typical glass sheet is a 90 mil thick annealed flat glass.

Alternatively, a rigid sheet may be a rigid polymeric sheet comprised of a polycarbonate, acrylics, polyacrylate, cyclic polyolefins, metallocene-catalyzed polystyrene and mixtures or combinations thereof. In general, a rigid sheet can be transparent to visible radiation.

Also disclosed herein are NIR reflective textiles that beneficially incorporate the disclosed compositions. The term 'textile' is herein defined to encompass any structure produced by the interlacing of yarns, multi-filament fibers, monofilament fibers, or some combination thereof. A textile can be generally planar or can be manipulated to form higher dimensional geometries. A textile can include fibers that incorporate a composition as disclosed herein in a predetermined, organized, and interlaced pattern, herein referred to as a weave or knit fabric (i.e., a fabric formed according to a weaving and/or knitting process), or optionally can include the fibers in a random pattern (a nonwoven fabric), or in a unidirectional prepreg fabric, in which multiple unidirectional fibers are aligned and held in a matrix of a polymeric binding agent.

According to one embodiment, continuous or stapled fibers of a textile can be formed from an NIR reflective composition. The fibers can then form a woven or nonwoven textile (optionally with other types of fibers) suitable for use in a covering for an architectural opening. For instance, a composition can be melt processed or solution processed to form fibers according to known fiber-forming technologies, which can then be utilized in forming a textile. Alternatively, a film or sheet of the composition, as described above, can be stripped to form filaments, fibers, or continuous yarn which can be used as formed or optionally combined, e.g., twisted, to form a yarn. A woven or nonwoven textile can then be formed to include the fibers.

According to another embodiment, rather than a homogeneous fiber or film formed of the composition, a composition can be utilized to coat a substrate. In particular, a composition can coat a substrate for use in forming a covering in an architectural opening. Substrates can include, for example, those formed of polymeric compositions (e.g., polyesters), wood, metal (e.g., aluminum) and textile substrates. Examples of textiles substrates can include, without limitation, filaments, fibers, yarns, threads, knits, wovens, nonwovens, and products formed from one or more individual textile portions attached to one another.

In one embodiment, a substrate can be formed of a high IR reflective material, such as glass, wood, or polyester. For example, a composition including one or more IR transparent or IR reflective pigments can be coated on an IR reflective yarn, such as a yarn formed of glass fibers, and a textile formed of the coated yarn can exhibit improved NIR reflection and a non-white color. In another embodiment, a composition can be coated on a door, a blind, a shutter, or the like formed of an IR reflective material, such as wood, IR reflective polymeric materials, metal, and so forth, and the product can exhibit improved NIR reflection.

In one preferred embodiment, a composition can coat a core fibrous structure that can be utilized to form a woven or nonwoven textile.

The core of a coated fibrous construct can include any conventional material known to the art including, without limitation, metal fibers; glass fibers, fiberglass yarn such as E-glass, A-glass, C-glass, D-glass, AR-glass, R-glass, S1-glass, S2-glass; carbon fibers such as graphite; boron fibers; ceramic fibers such as alumina or silica; aramid fibers such as Kevlar® marketed by E. I. duPont de Nemours, Wilmington, Del.; synthetic organic fibers such as polyester, polyolefin, polyamide, polyethylene, paraphenylene, terephthalamide, polyethylene terephthalate and polyphenylene sulphide; and various other natural or synthetic inorganic or organic fibrous materials known to be useful for forming coverings for architectural openings, such as cellulose, asbestos, cotton and the like.

A core of a composite fibrous structure can be a mono filament, e.g., a single glass filament, or can be a multifilament construct including a plurality of individual filaments combined together. For instance a core filament can be a yarn formed of a plurality of glass or polymeric filaments.

As utilized herein, the term 'yarn' refers to a continuous strand of one or more textile fibers, filaments, or material in a form suitable for knitting, weaving, or otherwise intertwining to form a textile fabric. Yarn can occur in any of the following forms: a number of fibers or filaments twisted together; a number of filaments laid together without a twist; a number of filaments laid together with a degree of twist; a single filament with out without a twist; or a narrow strip of material (e.g., paper, polymer film, metal) with or without a twist. The term 'yarn' also encompasses spun yarn formed of staple fibers. Staple fibers are natural fibers or cut lengths of filaments. Manufactured staple fibers are cut to a length, generally from about 1 inch to about 8 inches.

As utilized herein, the term 'filament' generally refers to a single strand of an elongated material, and the term 'fiber' generally refers to any elongated structure that can be formed of a single or multiple filaments. Hence, in certain embodiments, the terms filament and fiber may be used interchangeably, but this is not necessarily the case and in other embodiments, a fiber can be formed of multiple individual filaments.

A multi-filament yarn can be formed according to any standard practice. For instance each of the formed filaments can be treated with sizing, etc. prior to combination to form a multi-filament construct. By way of example, surface treatment of individual glass filaments used to form a twisted glass multi-filament yarn has been carried out with specific sizings to prevent breakage of the filaments during processing (see, e.g., U.S. Pat. No. 5,038,555 to Wu, et al., which is incorporated herein by reference).

Once formed, a yarn (either multi-filament or mono-filament) can be coated with a composition as disclosed herein according to known methods including, without limitation, extrusion, strand coating, and so forth. For instance, a core yarn can be passed through a die, with peripheral delivery around the core of a sheath of the composition. One such coating method is described in U.S. Patent Application Publication No. 2007/0015426 to Ahmed, et al., which is incorporated herein by reference. The coated yarn can be cured by a variety of techniques known in the art including, thermal, IR radiation, photoactivation, e-beam or other radiation type curing, and others. A preferred curing method can generally depend upon the resin of the composition. Following cure, the coated yarn can be pulled through nip rollers prior to being wound on a winder for later processing.

A coating process can be repeated with the same or different coating compositions to form a multi-layered product. For instance, a yarn can be coated multiple times with the same coating composition to increase solar characteristics and/or to provide thicker overall coatings. Different compositions can also be utilized in multiple coating layers, for instance to effect the perceived color of the finished product, to provide the desired concentration of coating materials in several low viscosity composition applications, and the like.

According to one embodiment, a first coating layer can be formed on a substrate that exhibits high reflectivity and a second coating layer can be formed on the substrate over the first coating layer that can exhibit desirable color and a lower IR reflectivity and/or higher IR transparency as compared to the first layer. For example, the first coating layer can include a relatively large amount of highly reflective pigment, for example a white pigment, and the second, outer coating layer can include IR transparent and or IR reflective pigments (as well as other, more traditional pigments) to provide the desired color to the composite.

The inclusion of a first, inner layer that exhibits a high IR reflectivity can increase the overall reflectivity of the substrate. The second layer, which can also exhibit IR reflectivity, and can include one or more IR reflective and/or IR transparent pigments, at least one of which is a non-white pigment, can provide a desired color to the coated substrate, and can enhance the IR reflectance and/or transparency of the coated substrate.

For example, when considering a fibrous substrate such as a yarn or fiber, an inner, first layer that has a high IR reflectivity can increase the highly reflective surface area of the fiber. The inner layer can also exhibit little or no IR transparency. The addition of a second layer on the substrate that is IR reflective and/or IR transparent, and that also includes IR reflective and/or transparent pigments that are non-white can provide a highly IR reflective and/or IR transparent composite in any of a wide variety of non-white colors.

As previously mentioned, many of the pigments for use in a composition, e.g., many IR reflective pigments, are highly abrasive, which has prevented the use of such pigments as coatings for textile substrates, such as yarn, fibers and formed fabrics. Also disclosed herein are methods and coated substrates that solve this problem. According to this embodiment, a substrate can include at least two coating layers thereon, such that a coating layer that includes an abrasive additive, e.g., an abrasive IR reflective pigment, is not immediately adjacent to the substrate core. For instance, a glass fiber yarn can be coated with a first composition that can include a non-abrasive IR transparent pigment. Following, this fiber can be coated with a second composition that can include an abrasive IR reflective pigment.

The first composition can include ER transparent and/or reflective pigments, can include more traditional pigments, or can include no pigments at all. More specifically, it should be understood that the inner layer, for instance the layer immediately adjacent the core substrate (e.g., the fiber, woven, or nonwoven textile) can be formed of a composition as disclosed herein or a different composition, as desired. For instance, a first layer can be formed of a plastisol that includes traditional pigments or alternatively no pigment at all, and a subsequent layer can include an abrasive pigment. In one embodiment, the first layer can be formed of a highly reflective composition, with little or no darker colored IR reflective and/or transparent pigments, and the second composition can include one or more abrasive IR reflective and/or transparent pigments.

When considering formation of a composite that includes multiple coating layers on a substrate, the second, outer coating layer (or any additional layers) can be formed according to the same coating process as the first, inner coating layer, or according to a different method, as desired. For instance, a multi-strand fiber glass yarn can be coated with a first layer according to a peripheral extrusion process and following cure a second layer can be coated on the fiber according to a dip-coating method.

A similar multi-layer coating process can be carried out with any substrate, including a fiber or a formed nonwoven or woven textile product. For example, following formation of a textile that incorporates a yarn, the textile can be coated with multiple layers such that a composition that incorporates abrasive pigments is not immediately adjacent the formed textile, such that one or more inner layers exhibit high IR reflectivity, or with multiple coating layers of the same coating composition.

Yarn incorporating disclosed compositions can be woven to form a textile. A woven textile can include such yarn in the warp, weft, or both directions of the formed textile. Moreover, the warp and/or weft yarn can include other yarn, in addition to the disclosed yarn types. Individual steps in an exemplary woven fabric manufacturing process will be described in more detail. Beaming (or warping) is a common intermediate step in woven fabric formation in which a large number of individual yarns are pulled together in parallel and wrapped onto a cylinder, known as a warp beam, in preparation for transportation to a loom. Sectional warping is a two part process. In the first part, a relatively small number of ends are wound onto a rotating drum for a specified distance. As the yarn is wrapped around the drum, the drum moves laterally, i.e., perpendicular to the direction of the incoming yarn, and allows the yarn to build up against a tapered surface on one end of the drum. After a specified length of yarn is wrapped, the yarn is cut and tied off, and a small section of yarn remains. This process is repeated for a number of iterations until the desired width of yarn is pulled from the creel. During the second part, known as beaming off, the sections are pulled from the drum and wound on a warp beam. Sectional warping makes practical and economic sense when relatively short lengths of fabric, or densely woven fabric having a wide width, is produced, because it reduces the total number of bobbins required and increases the size of the bobbins.

In the warping and beaming steps, yarn is positioned on a sectional warping creel (e.g., a Benninger model No. 100522) utilizing a centrally controlled spring-loaded roller system for yarn tensioning and electronic end stop detection capability (e.g., an Eltex model No. 17820 Mini-SMG 121). Yarn pulled from the creel is threaded through the tensioners, stop motion detectors, and reed, and wound onto the drum of a sectional warper (e.g., a Hacoba model No. USK 1000E-SM). The yarn is beamed off onto a warp beam. A range of processing conditions as known in the art may be used to produce a warp beam for fabric production, and other types of warping equipment, lubricants, or warping techniques (direct warping, etc.) may be used depending on the exact nature of the yarn (such as size, shape, coating material, etc.), fabric specifications, and weaving equipment.

An IR reflective knit fabric can be formed via warp knit or weft knit, as desired. As is known, linear warp-knitting machines are provided with a plurality of bars designed to carry a plurality of thread-holding elements, commonly known as thread-guides. The bars can be moved so as to enable the threads associated with such thread-guides to be correctly fed onto the needles of the knitting machine for the formation of new fabric. In order to achieve its knitting task, the thread-guide bar makes two basic movements: a linear movement in front of or behind the hook of each needle, commonly known as "shog", and an oscillating movement on the side of each needle for bringing the threads alternatively before and behind the needle hook, commonly known as "swing". Jacquard-type thread-guide bars are also known, which are provided with jacquard devices allowing each thread-guide to move individually of an additional needle space, in the same or opposite direction, with respect to the shog movement of the bars.

In a weft knitting machine the loops are produced in a horizontal direction. A weft knitting machine is generally provided with a yarn feeder mounted, e.g., on a side cover on one end side in a longitudinal direction of a needle bed, so the knitting yarn is fed from a yarn feeding port of a yarn feeding member to a knitting needle. The yarn feeder includes a buffer rod that can temporarily store a knitting yarn and can apply a tension to the knitting yarn.

Any type of knitting machine can be utilized including, without limitation, a weft knitting fabric machine, in which fabric is knitted in a continuous, uninterrupted length of constant width; a garments length machine that has an additional control mechanism to co-ordinate the knitting action in the production of structured repeat sequence in a wale direction; a flat machine; a circular machine; and so forth.

A nonwoven textile encompassed herein encompasses any type of nonwoven fabric, e.g., a meltblown web, a spunbond web, and so forth. A meltblown nonwoven web can be formed by a process in which a molten thermoplastic material (e.g., a composition as disclosed herein) is extruded through a plurality of fine, usually circular, die capillaries as molten fibers into converging high velocity gas (e.g., air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto for all purposes.

A spunbond web generally refers to a nonwoven web that includes small diameter substantially continuous fibers. The fibers can be formed by extruding a molten thermoplastic material from a plurality of fine, usually circular, capillaries of a spinnerette with the diameter of the extruded fibers then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al., which are incorporated herein in their entirety by reference thereto.

A covering formed to include a composition as disclosed herein can reflect more NIR as compared to conventional pigment compositions and can improve the energy use for a building that utilizes the covering. For instance, a window covering including the disclosed compositions can reflect more than about 15% of the impinging NIR, for instance greater than about 25%, greater than about 50% or greater than about 70%. In one embodiment, a window covering can reflect between about 25% and about 75%, or between about 50% and about 75% of the NIR radiation of impinging solar radiation. A window covering can reflect more than about 30% of the total impinging solar radiation, or greater than about 40% in one embodiment. Coverings encompassed herein that can incorporate the disclosed compositions can include, without limitation, window and, door shades, window blinds, awnings, awning screens, skylight shades, sunroom/solarium shades, draperies and curtains, and so forth.

The present disclosure may be better understood with reference to the Examples, below.

Example 1

PVC-based plastisols were prepared as described below in Table 1. All concentrations are provided as phr (parts per hundred parts of resin). Six different compositions were formed in three different colors. For each color, one composition included at least one IR transparent or IR reflective pigment, and the other included only conventional pigments.

TABLE 1

| | Run No. | | | | | |
|---|---|---|---|---|---|---|
| | 1 | 2 | 3 | 4 | 5 | 6 |
| | Color | | | | | |
| | Gray | | Black | | Dark Brown | |
| PVC resin | 100 | 100 | 100 | 100 | 100 | 100 |
| Plasticizer | 45 | 45 | 45 | 45 | 45 | 45 |
| stabilizer | 5 | 5 | 5 | 5 | 5 | 5 |
| Pigment - TPK 103 | 0.85 | — | 9.1 | — | 2.3 | — |
| Pigment - TPK 104 | 0.32 | — | 1.4 | — | — | — |
| Pigment - TPR 143 | 0.32 | — | 0.26 | — | 3.4 | — |

TABLE 1-continued

| | Run No. | | | | | |
|---|---|---|---|---|---|---|
| | 1 | 2 | 3 | 4 | 5 | 6 |
| | Color | | | | | |
| | Gray | | Black | | Dark Brown | |
| Pigment - TPY 82 | — | — | 0.3 | — | 3.5 | — |
| Pigment - TPW 12 | 4.5 | — | — | 1.2 | 3.5 | — |
| Pigment - TPK 82 | — | — | — | 4 | — | — |
| Pigment - TPS 196 | — | 1.85 | — | — | — | — |
| Pigment - TPN 174 | — | — | — | — | — | 5.9 |
| lubricant | 1 | 1 | 1 | 1 | 1 | 1 |
| Flame retardant | 3.5 | 3.5 | 3.5 | 3.5 | 3.5 | 3.5 |
| Viscosity Reducing Agent | 12 | 12 | 12 | 12 | 12 | 12 |

Specific components utilized included:
PVC resin—a 40/60 w/w mixture of Lacovyl® PS 1070 and Lacovyl® PB 1302, both available from Arkema.
Plasticizer—Palatinol® L9P, a linear phthalate plasticizer available from BASF.
Stabilizer—Ba, Zn mixed stabilizer available from Acros
Pigments—All available from Toncee, Inc. of Smyrna, Georgia, USA
  TPK 103—black IR transparent pigment dispersed in diisononyl phthalate (DINP)
  TPK 104—black IR transparent pigment dispersed in DINP
  TPR 143—red IR transparent pigment dispersed in DINP
  TPY 82—yellow IR transparent pigment dispersed in DINP
  TPW 12—white pigment dispersed in DINP
  TPK 82—pigment with carbon black dispersed in DINP
  TPS 196—pigment with carbon black dispersed in DINP
  TPN 174—pigment with carbon black dispersed in DINP
Lubricant—SiAk from Wacker Chemie AG
Flame retardant—White Star N antimony trioxide, available from the Campine Company of Belgium
Viscosity reducing agent—Isopar® available from ExxonMobil Chemical To prepare the compositions, the materials listed for each run in Table 1 were mixed for 2 hours. Following, ECG 150 multi filament fiberglass available from Saint-Gobain Vetrotex was coated by a strand coating process. The coating thickness was 50-100 μm and was regulated by sending the yarn through a die. Following coating, curing was carried out at 180° C. by sending the coated yarn through an oven. The fibers were woven using a Rapier loom to form a fabric and heat set at 160° C. A basket weave was used with a 5% openness factor.

Fabrics were formed utilizing fiberglass yarn coated with the composition of Run 3 or Run 4 as the warp and fiberglass yarn coated with a composition of one of Runs 1-6 as the weft. The solar spectra of each of these six fabrics was measured using a Perkin Elmer LAMA 950 UV/Vis/NIR spectrophotometer with an integrating sphere with a white background and the solar reflectance was calculated according to ASTM E-891 in the wavelength range of about 300 to about 2500 nanometers. Results are shown in Table 2, below.

TABLE 2

| | Warp-Weft fibers (Run No. from Table 1) | | | | | | | | |
|---|---|---|---|---|---|---|---|---|---|
| | 3-1 | 3-2 | 3-3 | 3-4 | 3-5 | 3-6 | 4-2 | 4-4 | 4-6 |
| NIR Reflectance | 74.0 | 41.9 | 71.3 | 20.9 | 74.2 | 24.3 | 10.1 | 5.6 | 6.7 |
| Total Solar Reflect. 1 | 41.5 | 26.0 | 38.6 | 13.7 | 41.9 | 15.8 | 9.5 | 5.6 | 6.5 |

FIG. 1 compares the total solar reflectance from 300 to 2500 nm for three different fabrics:
  (a) warp yarn—coated with the composition of Run 3
    weft yarn—coated with the composition of Run 3
  (b) warp yarn—coated with the composition of Run 3
    weft yarn—coated with the composition of Run 4
  (c) warp yarn—coated with the composition of Run 4
    weft yarn—coated with the composition of Run 4

Figure 2:
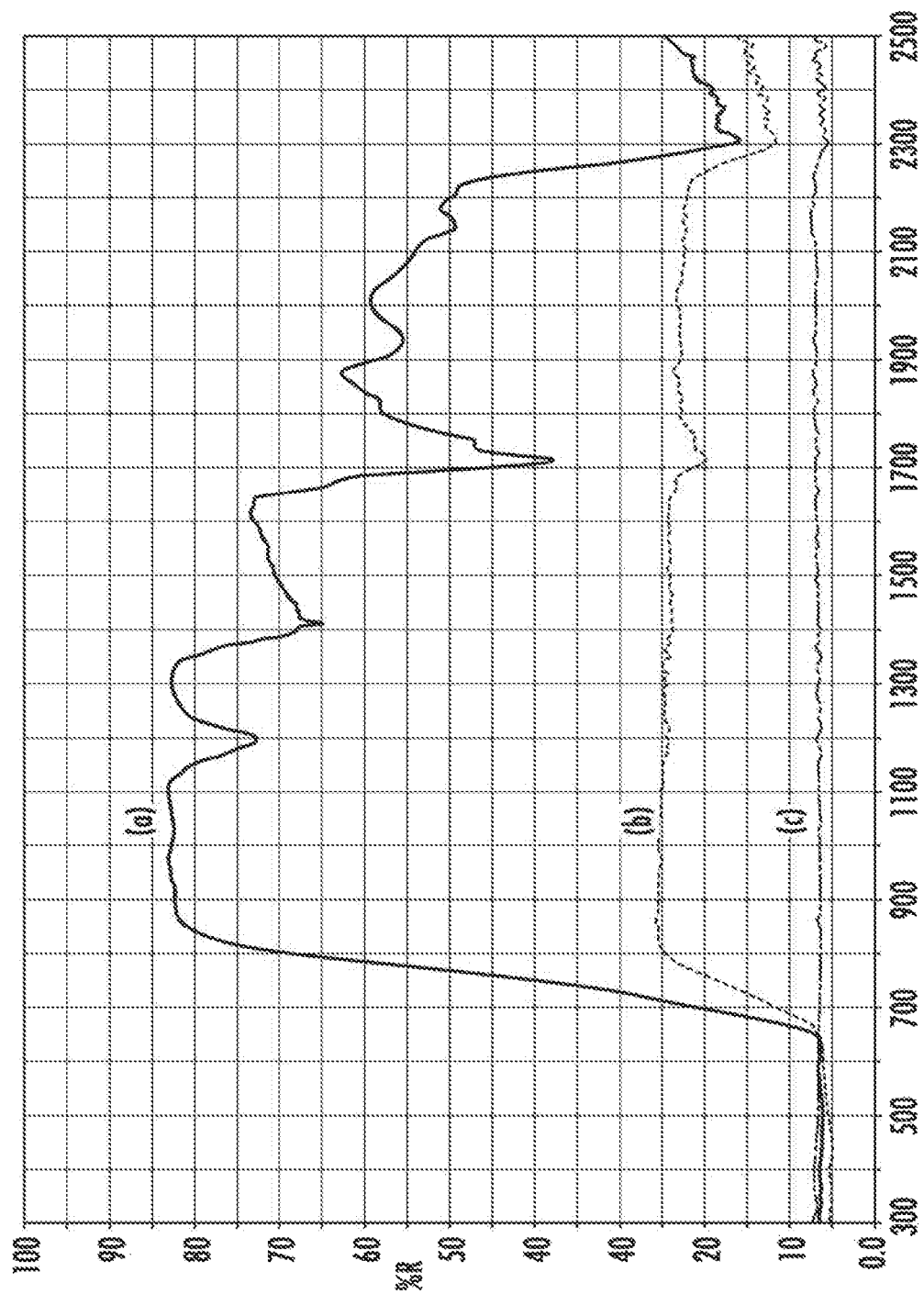
FIG. 2 graphically illustrates the total solar reflection of three different fabrics formed with black yarns in the warp and dark brown yarns in the weft, one of which includes NIR reflective yarns as described herein in the warp, one of which includes NIR reflective yarns as described herein in both the warp and weft, and one of which includes traditional yarns as described herein in both the warp and weft.

FIG. 2 compares the total solar reflectance from 300 to 2500 nm for three different fabrics:
  (a) warp yarn—coated with the composition of Run 3
    weft yarn—coated with the composition of Run 5
  (b) warp yarn—coated with the composition of Run 3
    weft yarn—coated with the composition of Run 6
  (c) warp yarn—coated with the composition of Run 4
    weft yarn—coated with the composition of Run 6

Figure 3:
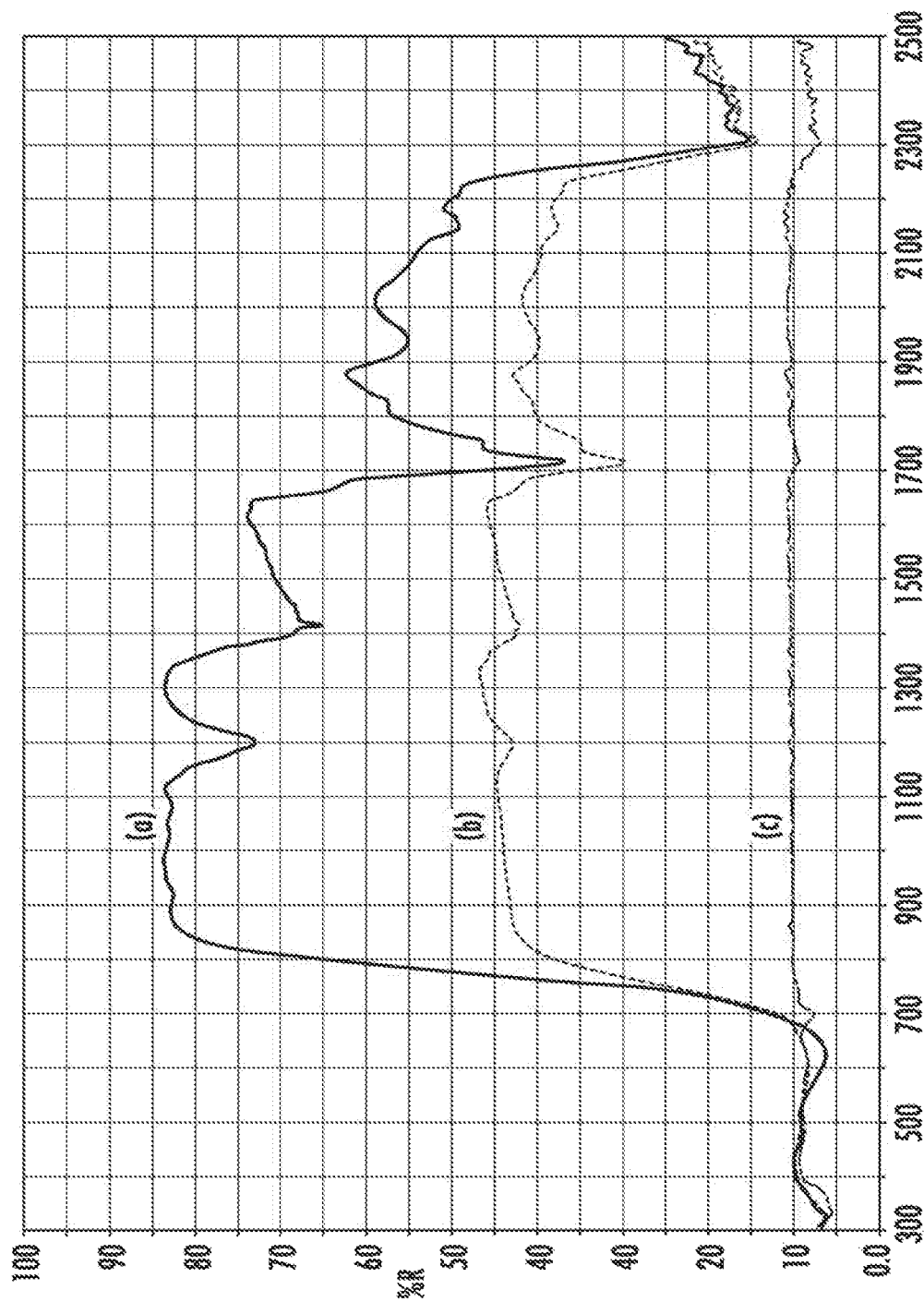
FIG. 3 graphically illustrates the total solar reflection of three different fabrics formed with black yarns in the warp and gray yarns in the weft, one of which includes NIR reflective yarns as described herein in the warp, one of which includes NIR reflective yarns as described herein in both the warp and weft, and one of which includes traditional yarns as described herein in both the warp and weft.

FIG. 3 compares the total solar reflectance from 300 to 2500 nm for three different fabrics:
  (a) warp yarn—coated with the composition of Run 3
    weft yarn—coated with the composition of Run 1
  (b) warp yarn—coated with the composition of Run 3
    weft yarn—coated with the composition of Run 2
  (c) warp yarn—coated with the composition of Run 4
    weft yarn—coated with the composition of Run 2

As can be seen, a dark fabric formed exclusively of fiberglass coated with a composition as disclosed herein can exhibit an NIR reflectance of over 80%. A fabric utilizing exclusively conventional yarn exhibits much lower NIR reflectance, while a fabric combining both types of yarn exhibits reflectance between the other two.

Example 2

PVC-based plastisols were prepared as described below in Table 3. All concentrations are provided as phr.

TABLE 3

| | Color | |
|---|---|---|
| | Gray | Violet |
| PVC resin | 100 | 100 |
| Plasticizer | 45 | 45 |
| stabilizer | 5 | 5 |
| Pigment - Lumogen ® FK 4280 | 1.5 | 1 |
| Pigment - RED K 3580 | 2.2 | — |
| Pigment - Black S 0084 | 4 | — |

TABLE 3-continued

| | Color | |
| --- | --- | --- |
| | Gray | Violet |
| lubricant | 1 | 1 |
| Flame retardant | 3.5 | 3.5 |
| Viscosity Reducing Agent | 12 | 12 |

Figure 4:
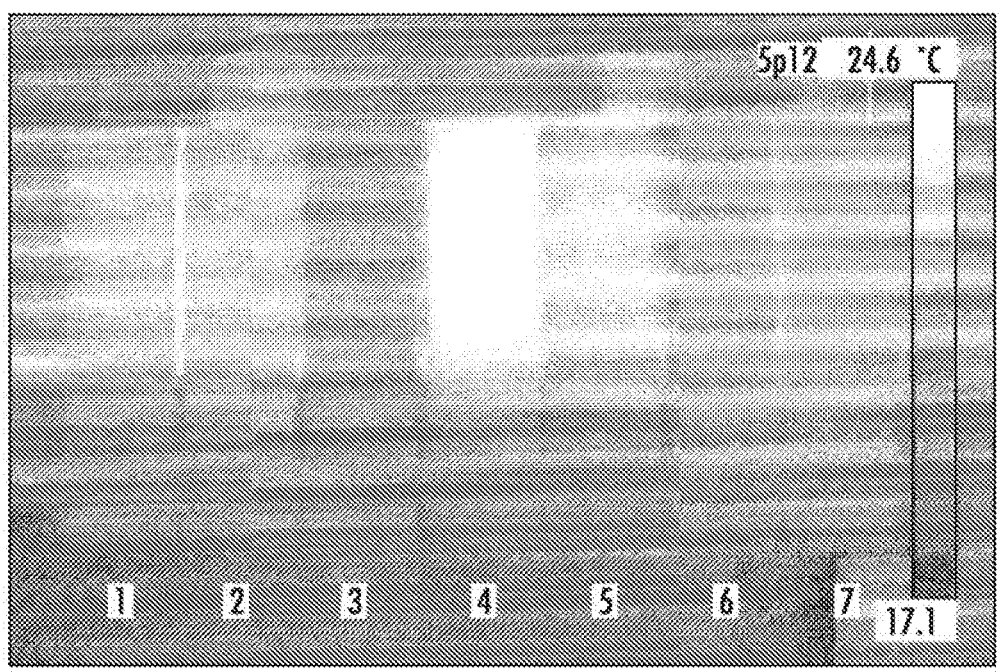
FIG. 4 includes IR images of several different fabrics, including fabrics formed of fibers coated with a composition as disclosed herein.

Specific components utilized were the same as indicated above in Example 1, except the pigments which were as follows:

Pigments—All available from BASF
  Lumogen® FK 4280—black IR transparent pigment
  RED K 3580—red IR transparent pigment
  Black S 0084—black IR transparent pigment FIG. 4 illustrates IR images of several different fabrics including, from left to right as numbered in the figure
1. Polyester yarn in warp and weft.
2. Polyester yarn in warp and weft.
3. White yarns in both the warp and weft where white pigment is ZnS.
4. Black yarns in both warp and weft where black pigment is carbon black.
5. Black yarns in both warp and weft where both yarn includes NIR reflective yarns.
6. Black fabric with aluminum coated backing Black yarns wherein both warp and weft is using carbon black as the pigment.
7. Black fabric with aluminum coated backing wherein both warp and weft is using carbon black as the pigment.

As can be seen, a black fabric formed with fiberglass yarn coated in the disclosed composition (fabric 5 in FIG. 4) can remain much cooler under IR as compared to other, more conventional fabric made from carbon black.

Example 3

PVC-based plastisols were prepared as described below in Table 4. All concentrations are provided as phr (parts per hundred parts of resin). Six different compositions were formed in three different colors. For each color, one composition included at least one IR transparent or IR reflective pigment, and the other included only conventional pigments.

TABLE 4

| | Composition No. | | | | | | |
| --- | --- | --- | --- | --- | --- | --- | --- |
| | 1 | 2 | 3 | 4 | 5 | 6 | 7 |
| | Color | | | | | | |
| | Gray | | Black | | Dark Brown | | Black |
| PVC resin | 100 | 100 | 100 | 100 | 100 | 100 | 100 |
| Plasticizer | 45 | 45 | 45 | 45 | 45 | 45 | 45 |
| stabilizer | 5 | 5 | 5 | 5 | 5 | 5 | 5 |
| Pigment - TPK 103 | 0.85 | — | 9.1 | — | 2.3 | — | — |
| Pigment - TPK 104 | 0.32 | — | 1.4 | — | — | — | 2.4 |
| Pigment - TPK 105 | — | — | — | — | — | — | 7 |
| Pigment - TPR 143 | 0.32 | — | 0.26 | — | 3.4 | — | — |
| Pigment - TPY 82 | — | — | 0.3 | — | 3.5 | — | — |
| Pigment - TPW 12 | 4.5 | — | — | 1.2 | 3.5 | — | 22 |
| Pigment - TPK 82 | — | — | — | 4 | — | — | — |
| Pigment - TPS 196 | — | 1.85 | — | — | — | — | — |
| Pigment- TPN 174 | — | — | — | — | — | 5.9 | — |
| lubricant | 1 | 1 | 1 | 1 | 1 | 1 | 1 |
| Flame retardant | 3.5 | 3.5 | 3.5 | 3.5 | 3.5 | 3.5 | 3.5 |
| Viscosity Reducing Agent | 12 | 12 | 12 | 12 | 12 | 12 | 12 |

Specific components utilized included:
PVC resin—a 40/60 w/w mixture of Lacovyl® PS 1070 and Lacovyl® PB 1302, both available from Arkema.
Plasticizer—Palatinol® L9P, a linear phthalate plasticizer available from BASF.
Stabilizer—Ba, Zn mixed stabilizer available from Acros
Pigments—All available from Toncee, Inc. of Smyrna, Georgia, USA
  TPK 103—black IR transparent pigment dispersed in diisononyl phthalate (DINP)
  TPK 104—black IR transparent pigment dispersed in DINP
  TPK105—black IR transparent pigment dispersed in DINP
  TPR 143—red IR transparent pigment dispersed in DINP
  TPY 82—yellow IR transparent pigment dispersed in DINP
  TPW 12—white pigment dispersed in DINP
  TPK 82—pigment with carbon black dispersed in DINP
  TPS 196—pigment with carbon black dispersed in DINP
  TPN 174—pigment with carbon black dispersed in DINP
Lubricant—SiAk from Wacker Chemie AG
Flame retardant—White Star N antimony trioxide, available from the Campine Company of Belgium
Viscosity reducing agent—Isopar® available from Exxon Mobil Chemical To prepare the compositions, the materials listed for each composition in Table 3 were mixed for 2 hours. Following, ECG 150 multi filament fiberglass available from Saint-Gobain Vetrotex was coated to give two layers of coating by a strand coating process using one or more of the compositions in Table 4 in each layer. The coating thickness was 50-100 μm and was regulated by sending the yarn through a die. In coating, the first coating layer was applied and then cured in an oven at 180° C. by sending the coated yarn through the oven. At the oven exit, the second layer was applied and then cured in a second oven at 180° C. Following, the hard cured yarn was cooled down in a chilled water bath and wound on to bobbins. The yarns were woven using a Rapier loom to form a fabric and heat set at 160° C. A basket weave was used with a 3% openness factor.

Fabrics were formed utilizing fiberglass yarn coated with the composition nos. 7 and 3 in the first and second layer, respectively, or two layers of composition no. 4 as the warp fibers, and fiberglass yarn coated with one or more compositions of Table 4 with compositions 1-7 as the weft. The composition of the warp and weft yarn was varied according to the composition used for the layer 1 and layer 2 in coating process, and is given as x-x in table 5, where x can vary from 1-7. For example, where the warp yarn is reported as 7-3, the first layer was formed with composition 7 as described in Table 4, and the second layer was formed with composition 3 as described in Table 4. The solar spectra of each of these fabrics was measured according to ASTM E 903-96 using a Perkin Elmer LAMBDA 950 UV/Vis/NIR Spectrophotometer with an integrating sphere using a black trap, and the solar reflectance was calculated according to ASTM E-891 in the wavelength range of about 300 to about 2500 nanometers. Results are shown in Table 5, below.

TABLE 5

| | Warp:Weft fibers | | | | | | | | |
|---|---|---|---|---|---|---|---|---|---|
| | 7-3:1-1 | 7-3:2-2 | 7-3:7-3 | 7-3:4-4 | 7-3:5-5 | 7-3:6-6 | 4-4:2-2 | 4-4:4-4 | 4-4:6-6 |
| NIR Reflectance | 57 | 42 | 63 | 27 | 63 | 30 | 11 | 5 | 7 |
| Total Solar Reflect. 1 | 34 | 26 | 35 | 17 | 36 | 19 | 10 | 5 | 7 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged either in whole or in part. Furthermore, those of ordinary skill in the art will appreciate that the foregoing description is by way of example only, and is not intended to limit the invention so further described in such appended claims.

What is claimed:

1. A method for forming a textile, the method comprising:
coating a plurality of warp strands with a first composition having a viscosity of less than about 5,000 centipoise as measured with a Brookfield RTV at 20 RPM, the first composition comprising a first plastisol that includes a first vinyl polymer and a first plasticizer, the first composition further comprising a first non-white infrared transparent pigment and a first viscosity reducing agent, the coating having a thickness on the warp strands of 50 micrometers to 100 micrometers;
curing the first composition coated on the warp strands to form a plurality of individually coated warp strands;
coating a plurality of weft strands with a second composition having a viscosity of less than about 5,000 centipoise as measured with a Brookfield RTV at 20 RPM, the second composition comprising a second plastisol that includes a second vinyl polymer and a second plasticizer, the second composition further comprising a second non-white infrared transparent pigment and a second viscosity reducing agent, the coating having a thickness on the weft strands of 50 micrometers to 100 micrometers;
curing the second composition coated on the weft strands to form a plurality of individually coated weft strands; and
weaving the weft strands and the warp strands to form the textile; wherein
at least one of the first composition and the second composition is free of any infrared reflective pigment; and wherein
the textile reflects more than 30% of total impinging solar radiation and has a CIELAB L* value of about 50 or less.

2. The method of claim 1, wherein at least one of the first vinyl polymer and the second vinyl polymer comprises a polyvinyl chloride or a high molecular weight acrylic polymer.

3. The method of claim 1, wherein one of the first composition and the second composition further comprises an infrared reflective pigment and the other of the first composition and the second composition is free of any infrared reflective pigment.

4. The method of claim 1, further comprising coating the warp strands and/or the weft strands with a third composition, wherein the third composition comprises an infrared reflective pigment and/or a third infrared transparent pigment.

5. The method of claim 1, wherein:
the first non-white infrared transparent pigment comprises a first black infrared transparent pigment; and
the second non-white infrared transparent pigment comprises a second black infrared transparent pigment.

6. The method of claim 1, further comprising forming a window covering comprising the woven textile.

7. The method of claim 1, wherein at least one of the warp strands and the weft strands comprises a continuous yarn.

8. The method of claim 1, the second composition differing from the first composition.

9. A method for forming a textile, the method comprising:
coating a plurality of warp strands with a first composition having a viscosity of less than about 5,000 centipoise as measured with a Brookfield RTV at 20 RPM, the first composition comprising a first plastisol that includes a first resin and a first plasticizer, the first resin comprising a first vinyl polymer, the first composition further comprising a first non-white infrared transparent pigment and a first viscosity reducing agent, the coating having a thickness of 50 micrometers to 100 micrometers;
curing the first composition on the plurality of warp strands;
coating the thus coated warp strands with a second composition having a viscosity of less than about 5,000 centipoise as measured with a Brookfield RTV at 20 RPM, the second composition comprising a second plastisol that includes a second resin and a second plasticizer, the second resin comprising a second vinyl polymer, the second composition further comprising a second non-white infrared transparent pigment and a second viscosity reducing agent;

curing the second composition to form a plurality of individually coated warp strands;

coating a plurality of weft strands with a third composition having a viscosity of less than about 5,000 centipoise as measured with a Brookfield RTV at 20 RPM, the third composition comprising a third plastisol that includes a third resin and a third plasticizer, the third resin comprising a third vinyl polymer, the third composition further comprising a third non-white infrared transparent pigment and a third viscosity reducing agent;

curing the third composition on the plurality of weft strands;

coating the thus coated weft strands with a fourth composition having a viscosity of less than about 5,000 centipoise as measured with a Brookfield RTV at 20 RPM, the fourth composition comprising a fourth plastisol that includes a fourth resin and a fourth plasticizer, the fourth resin comprising a fourth vinyl polymer, the fourth composition further comprising a fourth non-white infrared transparent pigment and a fourth viscosity reducing agent;

curing the fourth composition coated on the weft strands to form a plurality of individually coated weft strands; and weaving the weft strands and the warp strands to form the textile, wherein at least one of the first, second, third, and fourth compositions is free of any infrared reflective pigment; and wherein the textile reflects more than 30% of total impinging solar radiation and has a CIELAB L* value of about 50 or less.

10. The method of claim 9, wherein at least one of the first, second, third, and fourth vinyl polymers comprises a polyvinyl chloride or a high molecular weight acrylic polymer.

11. The method of claim 9, wherein at least one of the first, second, third, and fourth plasticizers comprises a phthalate plasticizer.

12. The method of claim 9, wherein the viscosity reducing agents are present in the first, second, third, and fourth compositions in an amount of from about 5 parts per hundred parts to about 20 parts per hundred parts of the first, second, third, and fourth resins, respectively.

13. The method of claim 9, wherein each of the warp strands and the weft strands are a multi-filament fiber or a monofilament fiber.

14. The method of claim 9, wherein each of the warp strands and the weft strands are a yarn.

15. A method for forming a textile, the method comprising:

coating a yarn with a first composition having a viscosity of less than about 5,000 centipoise as measured with a Brookfield RTV at 20 RPM, the first composition comprising a first plastisol that includes a first polyvinyl chloride and a first plasticizer, the first composition further comprising a first non-white infrared transparent and a first viscosity reducing agent, the coating having a thickness of from 50 micrometers to 100 micrometers;

curing the first composition;

coating the yarn that is coated with the cured first composition with a second composition having a viscosity of less than about 5,000 centipoise as measured with a Brookfield RTV at 20 RPM, the second composition comprising a second plastisol that includes a second polyvinyl chloride and a second plasticizer, the second composition further comprising a second non-white infrared transparent pigment and a second viscosity reducing agent, this coating having a thickness of from 50 micrometers to 100 micrometers;

curing the second composition; and weaving or knitting the yarn, as coated with the cured first and second compositions, to form a woven or knitted textile; wherein at least one of the first composition and the second composition is free of any infrared reflective pigment; and wherein the woven or knitted textile reflecting 30% or more of total impinging solar radiation and having a CIELAB L* value of about 50 or less.

16. The method of claim 15, wherein the first cured composition exhibits a higher infrared reflectivity than the second cured composition.

17. The method of claim 15, wherein the yarn includes a plurality of glass or polymeric filaments.

18. The method of claim 3, wherein the infrared reflective pigment comprises a white infrared reflective pigment.

19. The method of claim 1, wherein the textile reflects more than 50% of the impinging solar radiation having a wavelength between about 700 nm and about 2500 nm.

20. The method of claim 9, wherein at least one of the first, second, third, and fourth compositions further comprises an infrared reflective pigment.

21. The method of claim 20, wherein the infrared reflective pigment comprises a white infrared reflective pigment.

22. The method of claim 9, wherein the textile reflects more than 50% of the impinging solar radiation having a wavelength between about 700 nm and about 2500 nm.

23. The method of claim 15, wherein of the first composition and the second composition further comprises an infrared reflective pigment and the other of the first composition and the second composition is free of any. infrared reflective pigment.

24. The method of claim 23, wherein the infrared reflective pigment comprises a white infrared reflective pigment.

25. The method of claim 15, wherein the textile reflects more than 50% of the impinging solar radiation having a wavelength between about 700 nm and about 2500 nm.

* * * * *